United States Patent [19]
Suzuki et al.

[11] 4,140,378
[45] Feb. 20, 1979

[54] VIEW FINDER DEVICE HAVING LIQUID CRYSTAL CELL

[75] Inventors: Ryoichi Suzuki, Kawasaki; Seiichi Matsumoto, Yokohama; Takashi Amikura, Tokyo; Tokuichi Tsunekawa; Takashi Uchiyama, both of Yokohama, all of Japan

[73] Assignee: Canon Kabushiki Kaisha, Tokyo, Japan

[21] Appl. No.: 712,344

[22] Filed: Aug. 6, 1976

[30] Foreign Application Priority Data

| Aug. 9, 1975 | [JP] | Japan | 50-96912 |
| Aug. 9, 1975 | [JP] | Japan | 50-96914 |
| Mar. 15, 1976 | [JP] | Japan | 51-27980 |
| Mar. 24, 1976 | [JP] | Japan | 51-32286 |
| Mar. 24, 1976 | [JP] | Japan | 51-32287 |
| Mar. 30, 1976 | [JP] | Japan | 51-34792 |

[51] Int. Cl.² ........................... G03B 17/20
[52] U.S. Cl. .................. 354/53; 354/23 D; 354/60 E; 354/289
[58] Field of Search .......... 354/23 D, 53, 56, 57, 354/60 E, 60 L, 227, 289

[56] References Cited

U.S. PATENT DOCUMENTS

| 3,727,527 | 4/1973 | Borowski et al. | 354/53 |
| 3,820,132 | 6/1974 | Lindner | 354/53 |
| 3,961,348 | 6/1976 | Miyazaki | 354/289 |

FOREIGN PATENT DOCUMENTS

| 2228589 | 8/1973 | Fed. Rep. of Germany | 354/53 |
| 2457877 | 6/1975 | Fed. Rep. of Germany | 354/53 |

*Primary Examiner*—Russell E. Adams
*Attorney, Agent, or Firm*—Toren, McGeady and Stanger

[57] ABSTRACT

A liquid crystal cell is provided within a camera viewfinder. In the cell, a liquid crystal is sandwiched between a resistance layer mounted on a substrate and another substrate-mounted layer which may be either resistive or conductive. Suitable means mask at least the end portions of the display of the liquid crystal cell. In operation, voltages corresponding to photographic conditions are applied to the layers to produce analog data indicative of photographic conditions.

4 Claims, 79 Drawing Figures

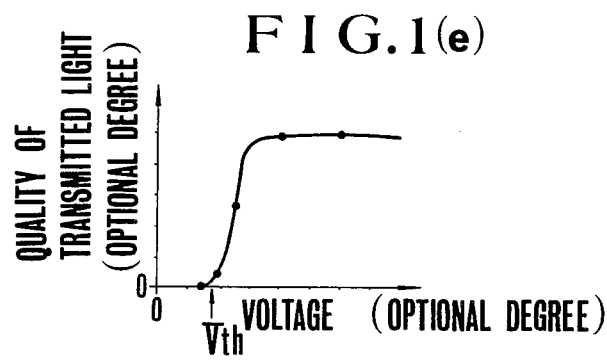
FIG.1(e)
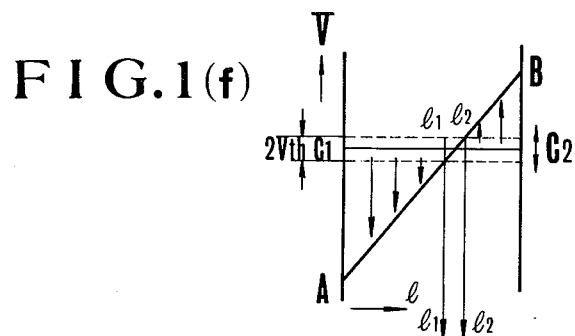
FIG.1(f)
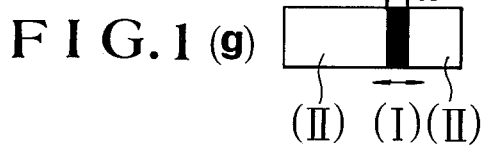
FIG.1(g)
FIG.1(h)
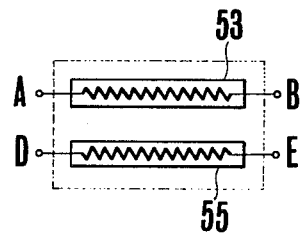
FIG.1(i)
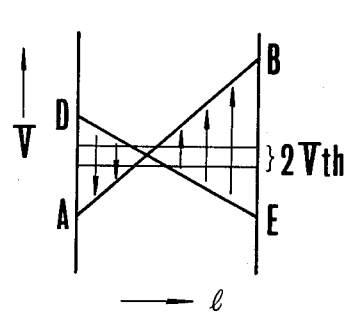

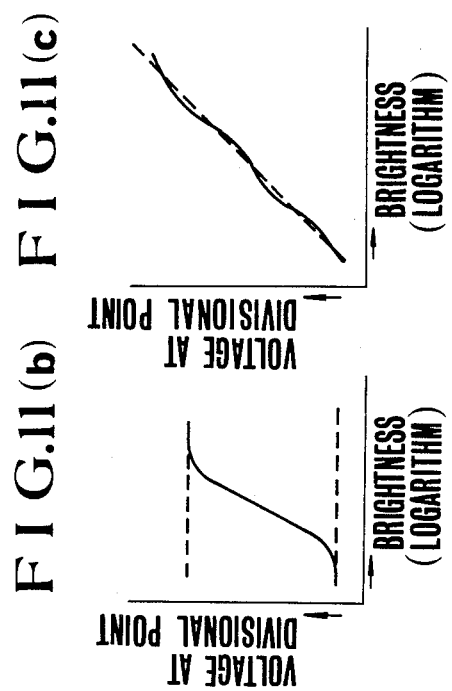

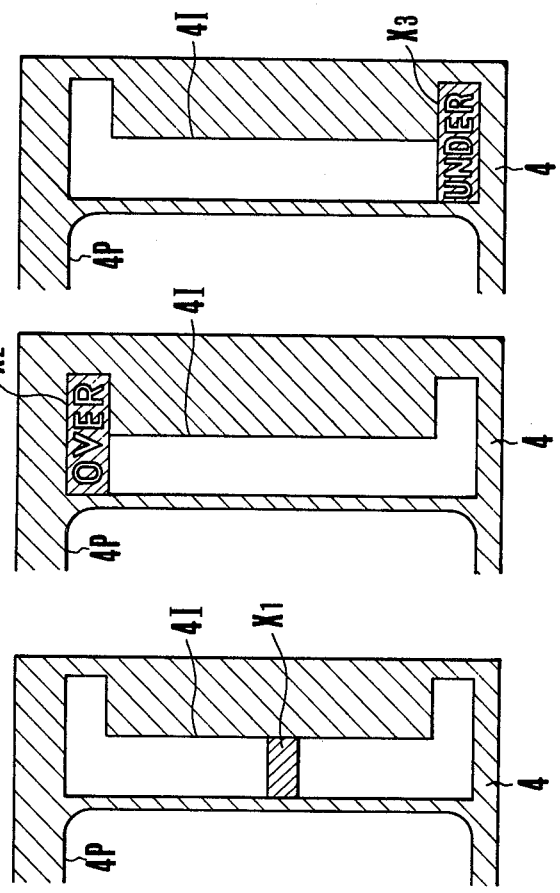

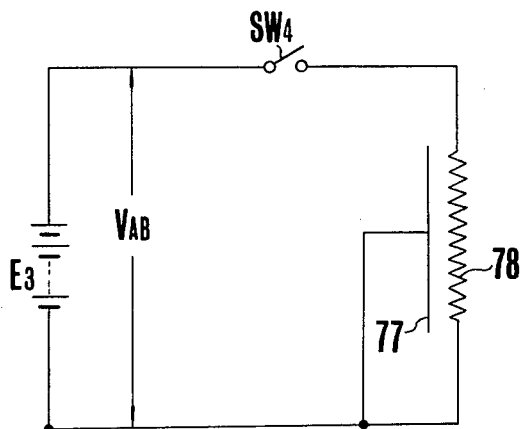
FIG.23
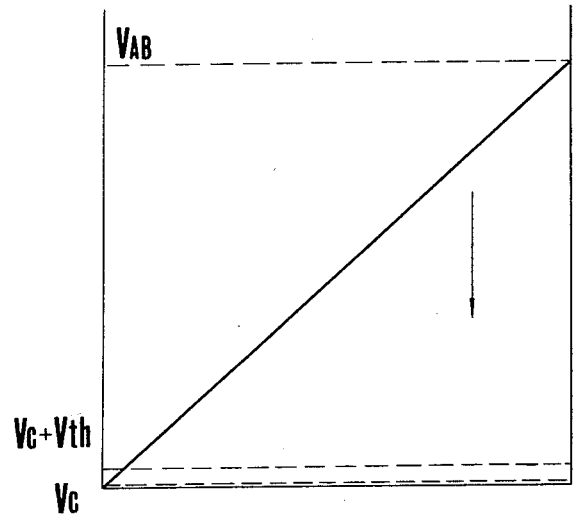
FIG.24
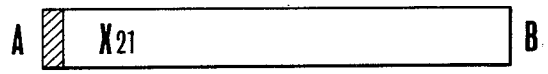
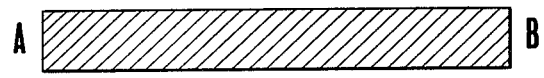

VIEW FINDER DEVICE HAVING LIQUID CRYSTAL CELL

BACKGROUND OF THE INVENTION

1. Field of the Invention

The present invention relates to a view finder display device having a liquid crystal cell for displaying photographic information and various kinds of alarms.

2. Description of the Prior Art

Conventional devices for displaying photographic data involve meters that incorporate D'Arsonval type moving-coil galvanometer arrangements. Such meters have a number of disadvantages such as susceptibility to disabling shocks and the high cost of miniaturizing these devices. Furthermore, the openings which permit the meter needle to project into the view field of a camera fiew finder, so that they can be seen while focusing, allow dust to enter the view finder. Moreover, the meter needle is sometimes difficult to see. As a further point, a photographer may become confused and fail to notice the needle when the needle moves into the red warning or limit zones that are frequently provided in the upper and lower ends of such view finders. It is possible to move warning members into and out of the visual field for purposes such as indicating a low battery voltage, but this makes the entire device rather complicated. Light emitting diodes (LEDs) may be used as limit indicators or warnings, but these consume considerable power.

Needless to say, the substitution of light emitting diodes for a moving coil meter would result in prohibitive power consumption. The act of checking the battery with such indicators would itself drain the battery unnecessarily.

In some viewfinders, the meter needle which displays photographic values such as the measured light, is also used to indicate the voltage during a battery check. The use of this single needle for multiple purposes may confuse the photographer.

Aside from these disadvantages, the projection of the meter needle into the viewfinder may adversely affect the operator's ability to compose a picture. On the other hand, if the needle does not project into the viewing frame, a photographer may not notice an alarm indication.

As a result, conventional viewfinders may become complicated and unnecessarily costly.

Liquid crystal devices of the type that have been used as displays require either high voltages or have been difficult to read.

An object of the invention is to improve viewfinder displays for cameras.

Another object of the invention is to avoid the aforementioned shortcomings.

SUMMARY OF THE INVENTION

According to a feature of the invention, a liquid crystal is sandwiched between a substrate supported resistance layer and a second substrate supported layer which may be either resistive or conductive, and the cell is placed in a portion of the viewfinder through which light passes. Suitable mask means mask at least the end portions of the liquid crystal cell.

These and other features of the invention are pointed out in the claims forming a part of the specification. Other objects and advantages of the invention will become evident from the following detailed description when read in light of the accompanying drawings.

BRIEF DESCRIPTION OF THE DRAWINGS

FIGS. 11(a)–(d) respectively show a driving circuit of the liquid crystal cell and an operation diagram.

FIGS. 14(a), (b) and (c) respectively show a display mode of the view finder display device in which the liquid crystal cell shown in FIG. 12 is applied.

FIG. 23 shows a circuit diagram for explaining the principle of another display system.

FIG. 24 shows a diagram for explaining the operation of the circuit shown in FIG. 23.

DESCRIPTION OF PREFERRED EMBODIMENT

Figure 1A:
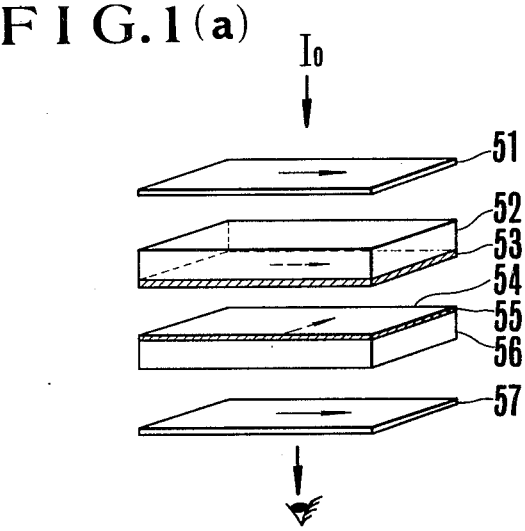
FIGS. 1(a)–(b) respectively show a liquid crystal cell suited for the finder display device in accordance with the present invention and diagrams for explaining its operation.

FIG. 1(a) illustrates a liquid crystal cell. Here, a first polarization plate 51 covers a base plate or substrate 52 on which a resistance layer 53 is formed. A second base plate or substrate 56 has a second layer 55 formed thereon. The latter layer 55 may be either a resistance layer or conductance layer. The layers 53 and 54 sandwich a field effect nematic liquid crystal between them. A second polarizing plate 57 covers the base plate 56. The liquid crystal cell of FIG. 1(a) is of the transparent type. According to another embodiment of the invention a reflection type liquid crystal cell may be used. Under these circumstances, a dispersion refracting plate is provided behind the polarizing plate 57.

Figure 1B:
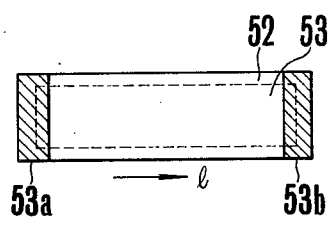
Figure 1C:
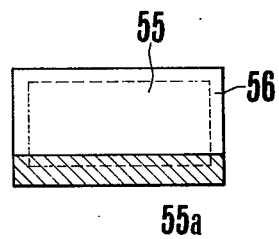

As shown in the plan view of the base plate 52 in FIG. 1(b), conductive members 53(a) and 53(b) form terminal electrodes at the ends of the resistance layer 53. As shown in the plan view of the base plate 56 in FIG. 1(c), a conductive terminal electrode 55(a) extends across one second of the layer 55.

Figure 1D:
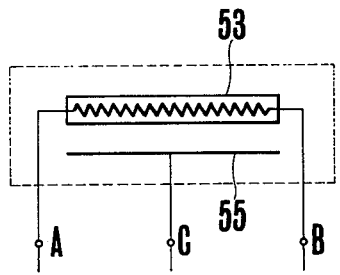

If the two base plates 52 and 56 are made equal to each other and mounted to be parallel and form a $4\mu$ to $50\mu$ gap filled with a field effect nematic liquid crystal. The entire structure is hermetically sealed and the terminal electrodes 53a, 53b, and 55a project through the seal for connection to an external circuit. FIG. 1(d) illustrates the liquid crystal cell schematically.

An arrow on the polarization plate 51 shows the plane of the polarization plate, an arrow on the resistance layer 53 indicates the direction of the orientation of the liquid crystal molecules on the resistance layer and an arrow on layer 55 the direction of the orientation of the liquid crystal molecules on the layer 55 opposite the resistance layer 53. The liquid crystal between both layers assumes a gradually distorted orientation in the angle between the two arrows shown in dotted lines. An arrow on the polarization plate 57 shows the polarization plane of the polarization plate. This polarization plate 57 is intended to detect the light coming out of the liquid crystal. In FIG. 1(a) the orientation of the liquid crystal molecules is distorted 90°. The polarization plane of incident light from above follows the polarization plane of the polarization plate 51 and is rotated an angle corresponding to the distorted orientation of the liquid crystal molecules when the light passes through the liquid crystal layer between the layers 53 and 55 so as to enter into the second polarization plate 57. When now the angle of the then polarization plane and that of the polarization plate 57 is 90°, the incident light Io is effectively blocked and an observer in the lower part of the drawing sees the cell in a dark state. When an electrical field higher than a predetermined intensity is applied to the liquid crystal cell the liquid crystal molecules are orientated with their long axes perpendicular to the surface of the base plate and the liquid crystal is isotropic to the incident light Io so that no rotation of the polarization plane of the incident light takes place. Consequently when the polarization directions of the two polarization plates are parallel to each other the light passes through when an electrical field is applied in such a manner that contrary to the non-applied state a bright state is observed. When the directions are made perpendicular to each other, the negative state and the positive state are inversed into each other.

FIG. 1(e) shows a diagram for explaining the electro-optical characteristics of the liquid crystal cell. The abscissa shows the voltage, the ordinate the amount of the transmitted light and Vth the threshold level. The diagram shows the effect of a field effect twisted nematic liquid crystal (hereinater called the TN effect). With the TN effect Vth is as low as 1-3 volts, while for the effect of deformation of a vertically aligned phase liquid crystal (hereinafter called DAP effect) Vth is 3-6 volts. Hence the threshold level for both of these cases is low as compared with the threshold level of 8-15 volts for a dynamic scattering liquid crystal whose effect is called the DSM effect. A variation of the TN effect and the DAP effect belongs to the field effect having low threshold level characteristics. They take place through the variation of the alignment of the liquid crystal or of the display detecting method by means of the polarization plate. Further there is a method to directly recognize the color variation due to the change of the alignment without using a polarization plate, by adding a dichromatic agent to the liquid crystal layer. Although the present liquid crystal cell can utilize liquid crystal having low threshold level characteristics, it is especially effective with the TN effect which exhibits the lowest threshold level of known liquid crystals.

The principal mode of driving the liquid crystal cell is by applying a voltage $V_{AB}$ to the points A and B across the resistance layer 53 and a voltage $V_C$ to the layer 55 at the point C in FIG. 1(d). This produces a voltage distribution as shown in FIG. 1(f) and an optical distribution as shown in FIG. 1(g). The voltage $V_{AB}$ is the difference between the voltage $V_B$ at the point B and $V_A$ at the point A and is substantially greater than Vth. The voltage $V_C$ is between the voltages $V_A$ and $V_B$. This produces the potential difference between the resistance layer 53 and the conductive or resistance layer 55 shown in FIG. 1(f). In FIG. 1(f) the solid horizontal line $C_1C_2$ represents the voltage $V_C$. While the termini of the line AB represent the respective voltages $V_A$ and $V_B$ the straight line AB illustrates the distribution of the potential along the resistance layer 53 which is assumed to be linear. When layer 55 shown in FIG. 1(d) consists of a conductive layer or a low resistance layer having a resistance sufficiently lower than the resistance layer 53, the applied voltage does not vary according to the position of l along the cell, so that $C_1C_2$ can be represented by a horizontal straight line representing the value $V_C$. The distribution of the voltage taking place in the liquid crystal occurs between the straight lines AB and $C_1C_2$. At the crossover the potential difference is zero. In the drawing, the potentials are shown with several arrows, although the voltage distribution is continuous. The electrooptical characteristics of the liquid crystal used are such that the crystal does not respond to electrical polarity. Hence, in the vicinity of the zero potential at the crossover point of lines AB and $C_1C_2$, within the range $l_1l_2$ in which the positive or negative potential difference is less than Vth, no electrooptical modulation takes place. Outside of the domain $l_1l_2$ modulation occurs. This produces a movable tape shaped domain with a center at $C_1C_2$ and width 2Vth. FIG. 1(g) shows a display in which the immodulated range (I) corresponding to the domain $l_1l_2$ serves as an indicator.

As explained above in accordance with the present invention it is possible to produce seemingly a point-shaped or a line-shaped indication within a domain (II) which in the voltages surpasses the threshold level of the liquid crystal and which is substantially larger than the domain (I) which in the voltage does not surpass the level.

Namely by means of the liquid crystal display device in accordance with the present invention the indication can be obtained steplessly or continuously at any position with any width in the indication range by changing the inclination of the potential difference between A and B (represently by the inclination of the straight line AB) or the change of the potential level at C (represented by the upward and the downward translation of the straight line $C_1C_2$).

In the liquid crystal cell shown in FIG. 1(h), layer 55 is the resistance layer, that is the layers provided on the two base plates 52 and 56 are both resistance layers. Hence, as is shown in FIG. 1(i) the distribution of the potential difference produced between the electrodes is represented by the arrows surrounded by the two straight lines. In this way, a substantially large distribution of the potential difference can be obtained with a voltage between A and B or D and E smaller than that in FIG. 1(f).

It goes without saying that not only the FE type liquid crystal cell but also the DSM type liquid crystal cell and so on can be used in the present invention.

Figure 2:
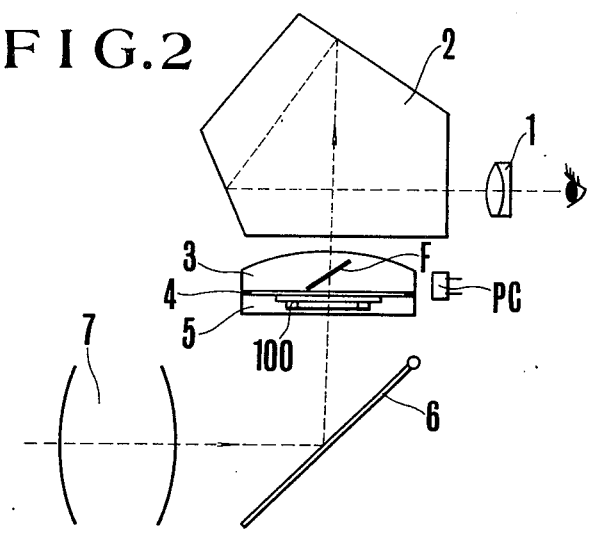
FIG. 2 shows an embodiment of the finder display device in accordance with the present invention, and built in a single reflex camera.

FIG. 2 shows an embodiment of view finder device in accordance with the present invention and built in a single reflex camera. The camera includes an eye piece lens 1, a pentagonal prism 2, a condenser lens 3, a view finder field frame 4, a focus plate 5, a reflex mirror 6, a photographic lens 7, a half permeable mirror F angular to the condenser lens, a photoelectric element PC and a display element 100 consisting of a liquid crystal cell provided in a part of the focus plate.

Figure 3A:
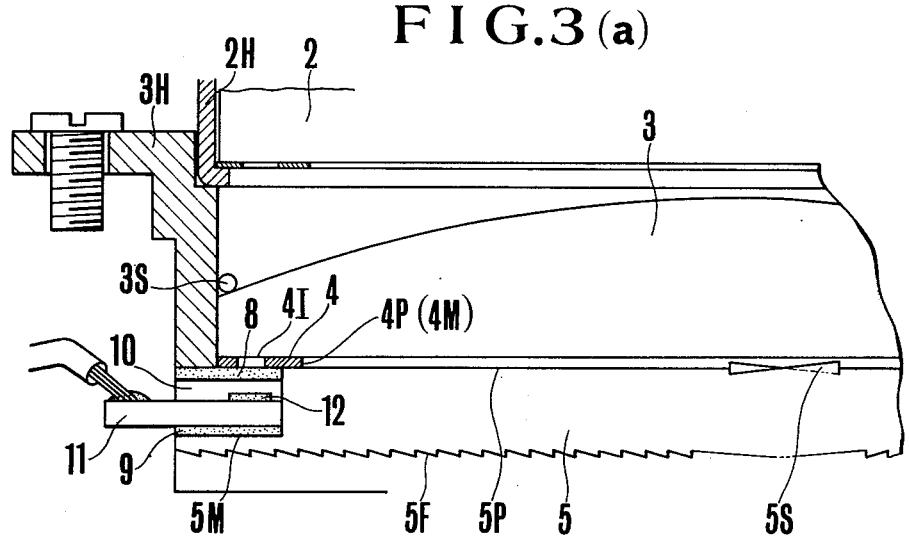
FIGS. 3(a) and (b) show the disposition of the liquid crystal cell shown in FIG. 2 respectively in section and in perspective view.
Figure 3B:
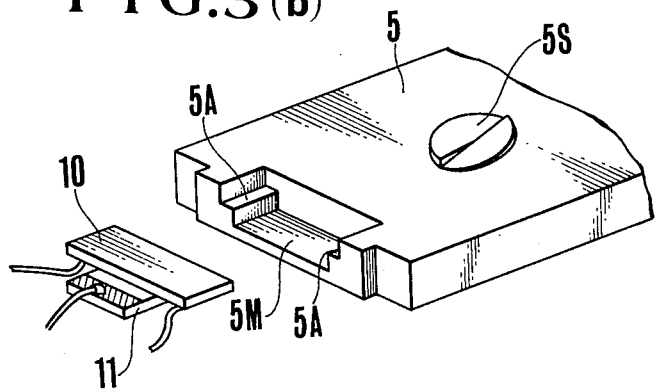

FIGS. 3(a) and (b) show the disposition of the liquid crystal cell shown in FIG. 2 in respective sectional and perspective views. The focus plate 5 is composed of acryl resin and forms, a split prism (or microprisms) 5S and a matted focus plane 5P on the upper surface. It forms a Fresnel prism 5F on the lower surface and a recess for mounting the display element as well as a matted plane 5M to be illuminated by the light from the object to be photographed and the mounting seat 5A for the display element and so on on the one side plane. The display element is constructed so that a desired electrical field V is applied to the liquid crystal material 12 surrounded by the plane glass plates 10 and 11 sandwiched between the polarization plates 8 and 9. The view field frame 4 forms the display window 5P, masks the junction of the focus plane 5P with the liquid crystal cell and serves as a spacer between the condenser lens and the focus plate. This not only furnishes a clear display but also prevents the invasion of dust.

Figure 4A:
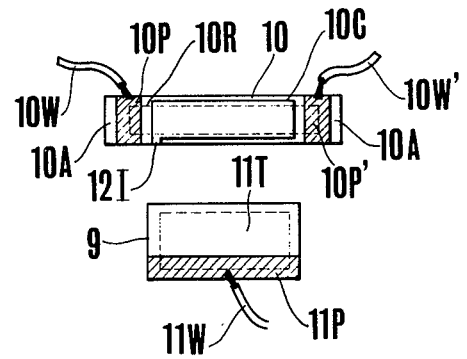
FIGS. 4(a) and (b) show the liquid crystal cell in detail respectively in plane view and in section.
Figure 4B:
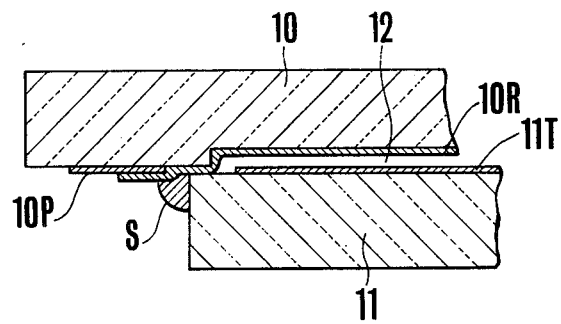

FIGS. 4(a) and (b) show the liquid crystal cell in detail in plan view and in section. The back side of the plane glass plate 10 is etched to form a concavity with an inlet 12I for the liquid crystal material 12. The transparent resistance body 10R is provided for example by means of metallization. It suffices that the resistance body 10R be thin as compared to the depth of the concave part 10C while the etched part of the concave part 10C can be 4-50μ so that leakage of the liquid crystal matter 12 at the time of the introduction can be avoided in a comparatively simple way. At both ends of the resistance body 10R the electrodes 10P and 10P' for wiring are provided for example by means of metallization. A transparent electrode 11T for wiring is metallized or otherwise applied on the surface of the plane glass plate and at the one end an electrode 11P. The both plane glass plates having been cemented to each other by means of a sealing agent S, the liquid crystal matter 12 is introduced through the inlet 12I under pressure, the inlet 12I is closed with the sealing agent S, the wires 10W, 10W' and 11W are soldered, the polarization plates 8 and 9 are mounted one over the other so as to form a liquid crystal cell and the mounting parts 10A are cemented on the mounting seat 5A.

Figures 5A, 5B:
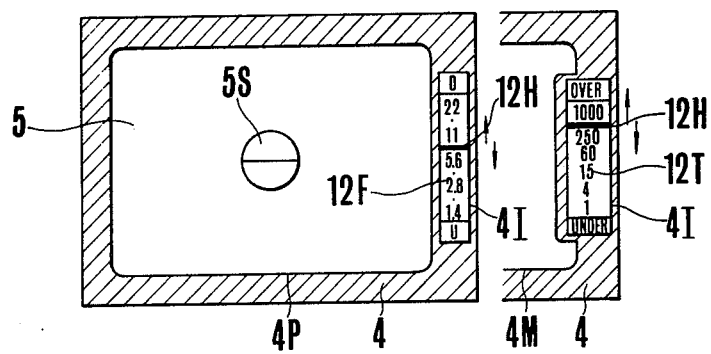
FIGS. 5(a) and (b) respectively show a view field of the view finder of the composition shown in FIGS. 2–4.

FIGS. 5(a) and (b) respectively show the view field of the view finder displaying the aperture value and the shutter time. In the drawing, 4P and 4M are the view field windows composed of the view field frames 4. FIGS. 5(a) and 5(b) further show a display scale with an over-exposure under-exposure part section formed at 5M of the focus plate 5. The latter is composed of acryl resin or a photographic film with figures in the neighborhood of the focus plane 5P. With this composition the untransparent part 12H is displayed when an electrical field is applied to the liquid crystal cell so that the content of the display can be seen almost at the position of clear optical vision. The view field frame 4 serving as masking means covers the juncture of the view field window with the display cell so that the display noise can be eliminated.

Figure 6:
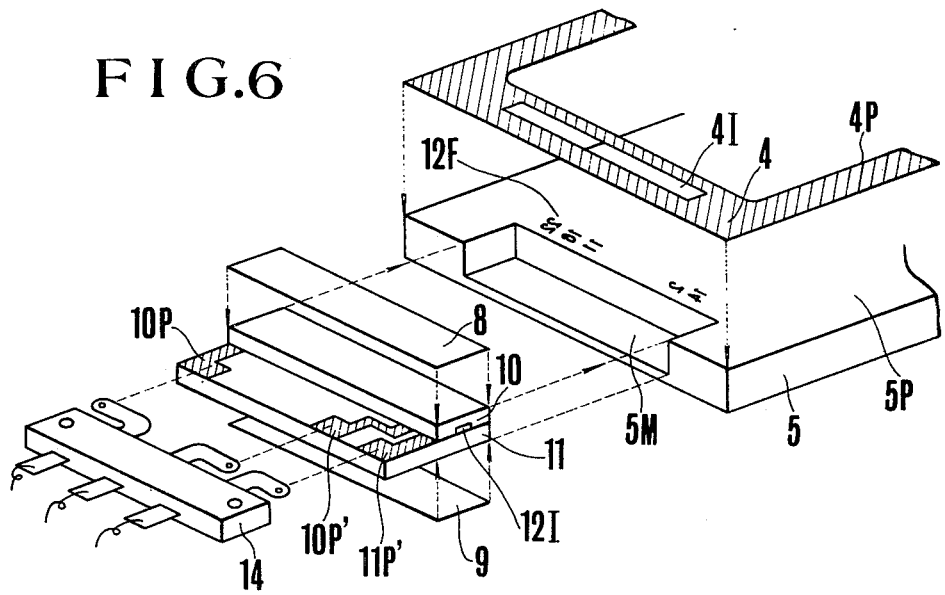
FIG. 6 shows a variation of the liquid crystal cell in perspective view.
Figure 7A:
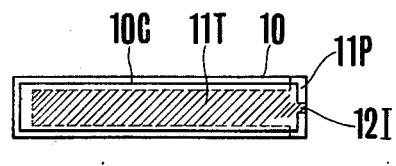
FIGS. 7(a), (b) and (c) respectively show the cell shown in FIG. 6 in detail.
Figure 7B:
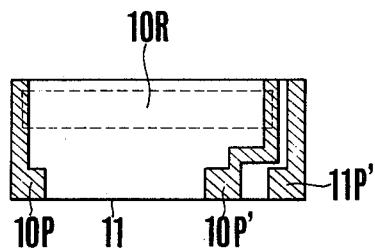
Figure 7C:
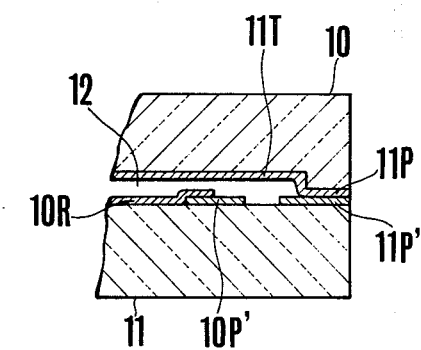

FIG. 6 shows a variation of the liquid crystal cell in perspective view, while FIGS. 7(a), (b) and (c) respectively show the cell shown in FIG. 6 in detail, whereby FIG. 7(a) shows the plane view of the plane glass plate 10, FIG. 7(b) the plane view of the plane glass plate 11 and FIG. 7(c) the enlarged section through the important part when the both glass plates are cemented with each other.

In FIGS. 6 and 7 the plane glass plate 11 is provided with three electrodes 10P, 10P' and 10P" for wiring, whereby the electrodes 10P and 10P' are connected to the transparent resistance body 10R on the plane glass plate 11, while the electrode 11P' is located at the position corresponding to the electrode 11P for wiring at the end of the transparent electrode 11T on the plane glass plate 10.

In accordance with the above mentioned wiring system, when the both plane glass plates in FIGS. 7(a) and (b) are cemented with each other, the electrode 11P for wiring on the one plane glass plate is connected to the electrode 11P' for wiring on the other plane glass plate automatically as is shown in FIG. 7(c). This is done so that three terminals can be taken out of the one of the plane glass plates so that the wiring can be carried out in a simple way. Further in order to take three terminals out of the one of the plane glass plates it is possible to make use of a terminal as is shown with 14 in FIG. 6. This is done in such a manner that as shown in FIG. 8 the liquid crystal cell can easily be built in the focus plate 5. The wiring is then simplified.

Further, it goes without saying that the transparent electrode 11T and the electrode 11P for wiring shown in FIG. 7(a) can be cemented by means of the same transparent resistance material.

Figure 8A:
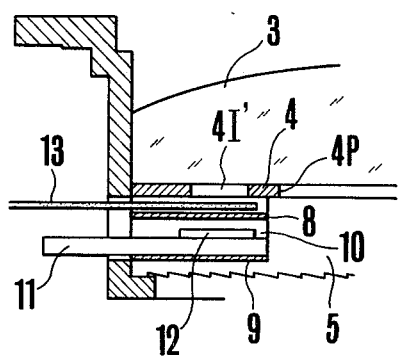
FIGS. 8(a), (b) and (c) respectively show another embodiment of the liquid crystal display part.
Figures 8B, 8C:
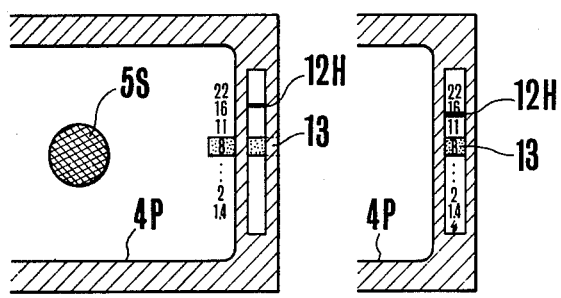

FIG. 8(a) shows a section through the important part of another embodiment of the liquid crystal cell display part while FIG. 8(b) shows the then view finder field mode. This embodiment is suited for the follow pointer system exposure setting, whereby between the liquid crystal cell and the dial plate a follow pointer 13 movable in functional engagement with the aperture ring or with the shutter time setting dial is provided in such a manner that the proper exposure can be obtained by means of watching the follow pointer with the light measurement display 12H of the liquid crystal cell. In accordance with this system the display in the view finder can be observed as is shown in FIG. 8(b). In the same way, as the afore-mentioned embodiment there is a mask 4 serving as a spacer provided so that even when dusts enter from the space in which the follow pointer moves, the dust reaches only the liquid crystal display part in such a manner that the internal part of the object view field window can be kept in the hermetic state. FIG. 8(c) shows a variation of the finder view field mode, whereby the follow pointer 13 is provided under the focus plate 5 as in case of the conventional camera or between the condenser lens 3 and the pentagonal prism 2.

Figure 9A:
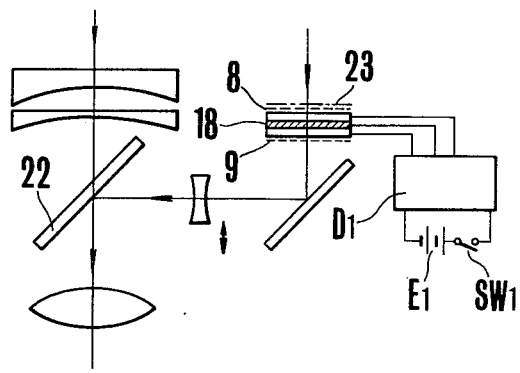
FIGS. 9(a)–(d) respectively show the liquid crystal display cell in the view finder of a camera mechanically linked with a range finder.

FIG. 9(a) shows further another embodiment. Here a liquid crystal cell is built in the view finder of the camera mechanically linked with the range finder. In the drawing, 18 is the liquid crystal cell presenting the polarization plates 8 and 9 and 22 a half permeable mirror. In front of the liquid crystal cell 18 a dial plate 23 provided with the aperture value, the shutter time and so on is provided in such a manner the aperture value display, the shutter time display and so on can be observed in the view finder. $D_1$ is the driving circuit for the liquid crystal cell while $E_1$ is the direct current source and $SW_1$ the switch.

Figure 9B:
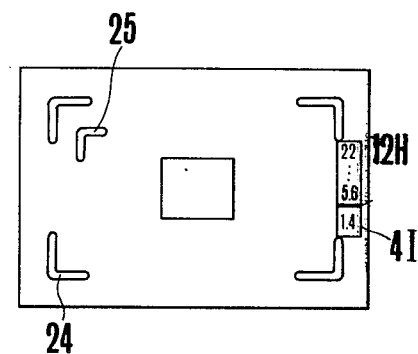
Figure 9C:
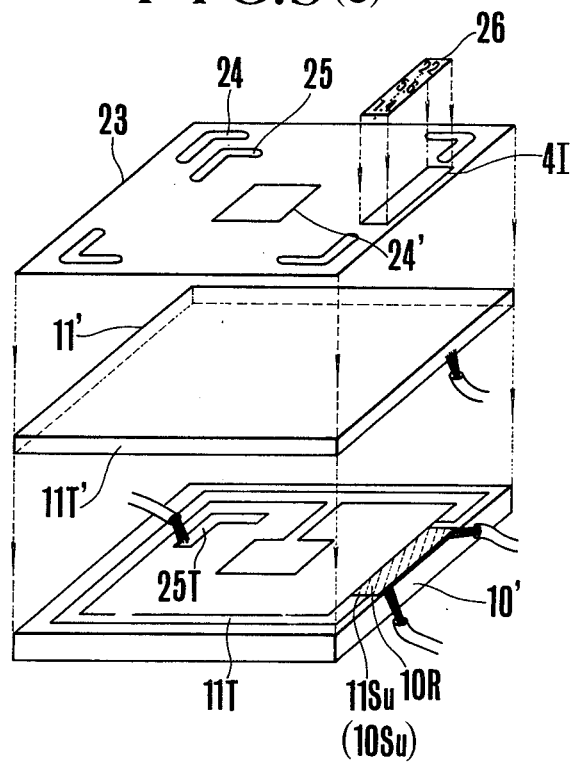

FIG. 9(c) shows an example of liquid crystal cell shown in FIG. 9(a). In the drawing, 10' is the one of a pair of the plane glass plates, on the surface of which plane glass plate 10' a transparent resistance body 10R and the transparent electrode 11T are cemented as is shown in the drawing. When the corresponding parts have been etched in advance in such a manner that the liquid crystal matter 12 can be introduced there. On the lower surface of the plane glass plate 11' opposite to the plane glass plate 10' a transparent electrode 11T' is cemented. On an untransparent dial plate 23 serving a mask for the liquid crystal display part the view field mark 24, the view field mark 25 for correcting the parallax, the light window 24' for double image and the display window 41 for letting the light in the scale seal 26 are provided. In the drawing, the polarization plates 8 and 9 are omitted. The three terminals of the above mentioned driving circuit are connected to the both terminals of the transparent resistance body 10R and to the transparent electrode 11T. The transparent resistance body 10R is connected to the transparent electrode 11T at the one end 11Su (10Su), so that when the switch of the driving ciruit is closed the view field mark 24 and the light measurement display part 41 are driven at the same time. When this is done the result shown in FIG. 9(b) can be obtained. Further on the upper surface of the plane glass plate 10' which is etched in such a manner that the liquid crystal matter can be introduced at the position of the view field mark for correcting the parallax, a transparent electrode 25T is provided. The latter is insulated from the transparent electrode 11T in such a manner that the electrode 25T is driven with other driving circuit than the above mentioned driving circuit at the time of the close-up photography. Hence the view field mark 25 for correcting the parallax can be observed at the time of the close-up photography.

Figure 9D:
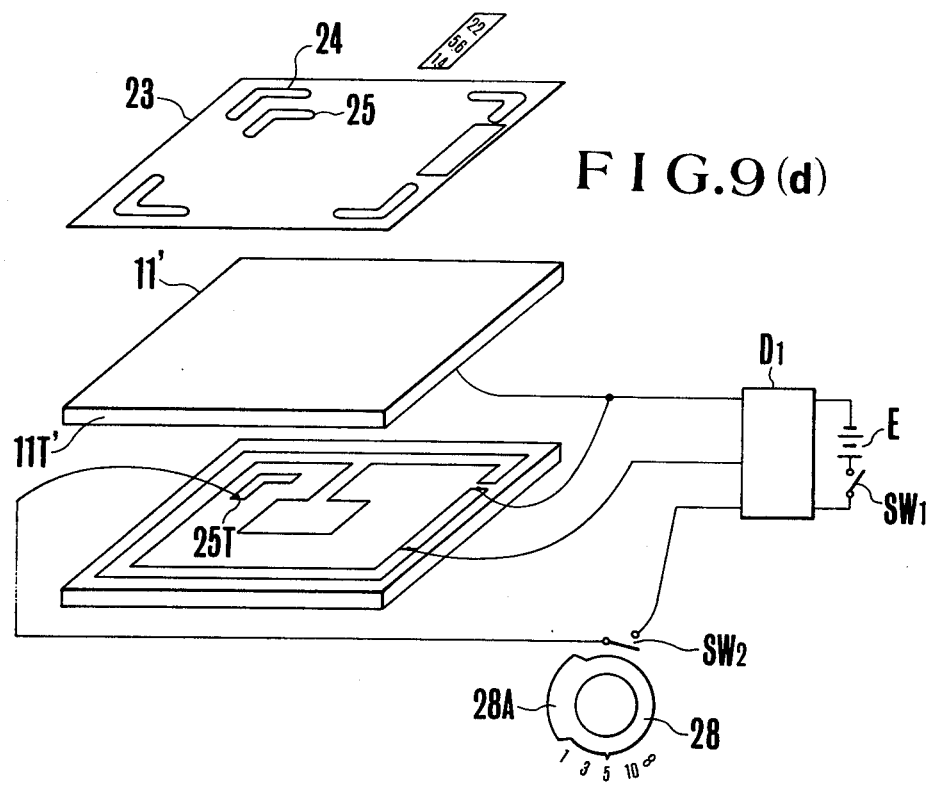

FIG. 9(d) shows a variation of the liquid crystal display cell, whereby the mark 25 for correcting the parallax appears automatically in accordance with the photographic resistance. In the drawing, 28 is the distance ring having a projection 28A, and $SW_2$ is the switch to be closed when it is pushed by the projection. Consequently, in accordance with this composition, when the focus comes in a photographic distance for which the correction of the parallax is needed, the switch is automatically closed in such a manner that a voltage is applied to the electrode 25T and the mark 25 for correcting the parallax is displayed in the view finder.

Figure 10A:
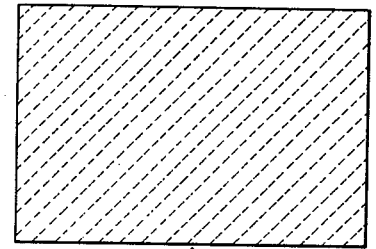
FIGS. 10(a) and (b) respectively show a variation of the liquid crystal cell display system.
Figure 10B:
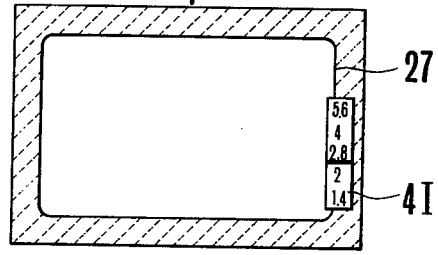

FIG. 10 shows a variation of the display system of the liquid crystal cell, whereby in this variation the view field frame is displayed in functional engagement of the battery. The liquid crystal cell, in which the liquid crystal is sandwiched between two glass plates on each of which a transparent electrode is cemented, and two dichromatic polarization plates are used. The polarization plates 8, 9 have the same area as the whole view finder plane. The area of the parts on which the above mentioned transparent electrodes are cemented is choosen to be of the same area as the whole range of the view finder range, in such a manner that when the switch of the battery is opened the whole plane is displayed in color as is shown in FIG. 10(a). When the switch of the battery is closed only the range inside of the view field frame 27 serving to mask the display part 41 is displayed in a transparent way, as is shown in FIG. 10(b). This display system not only displays the view field frame serving as the mask of the liquid crystal display part but also displays whether the battery switch is closed or opened.

Figure 11A:
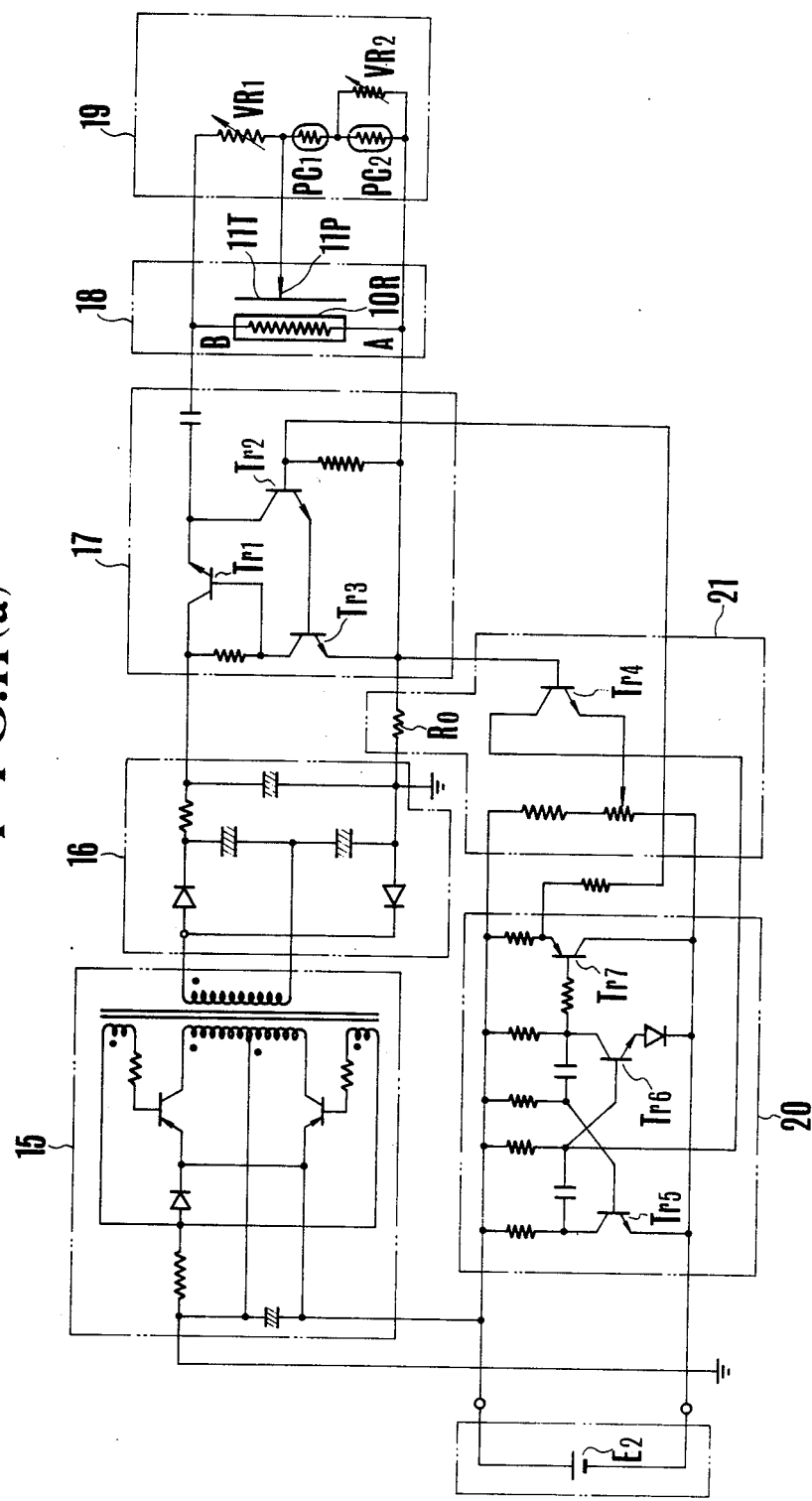

FIG. 11(a) shows an embodiment of the driving circuit composed of a combined cell of photoelectric elements. In the drawing, 15 is the power source circuit for giving a proper potential difference inclination to the transparent resistance body 10R of the liquid crystal. In order to obtain a narrow tape shaped display of a liquid crystal cell it is helpful to apply to the transparent resistance body 10 as high a voltage as possible so that a DC-AC inverter (called transistor type inverter) and so on is often used in order to stop the DC voltage $E_2$ up to a high AC-voltage. In operation, the transistor type inverter is in principle a vibrator. By making use of the saturation characteristics of the magnetic material of the transformer the switching effect of the transistor is maintained in such a manner that a given DC voltage producing a rectangular AC voltage with an optional voltage and an optional frequency is produced at the secondary of the transformer. This power source circuit is an oscillator generally with the frequency from several hundred to several thousand Hz, whereby the frequency of the AC applied to a liquid crystal becomes higher, the liquid crystal has a tendency to become unable to produce a clear tape shaped display due to its physical characteristics. In such a case, it becomes necessary to keep the frequency of the AC voltage to be applied to the liquid crystal cell under several hundred Hz. Even by means of the power source circuit 15 an oscillation below several hundred hz can be obtained, whereby the case of the oscillation transformer becomes remarkably large, which is out of practice. Consequently as is shown in the drawing a high frequency voltage from the secondary side of the transformer of the power source circuit 15 is rectified by means of the voltage doubler rectifier 16 into a high DC voltage which DC voltage is interrupted by means of a signal from the low frequency pulse generator 20 so as to obtain a low frequency AC voltage. Member 20 is the low frequency pulse generator consisting of a transistor multivibrator and so on, 17 the interrupting circuit, and 21 the overcurrent protector circuit. In this way, the above mentioned low frequency AC voltage is applied to the liquid crystal 18 and the light measuring circuit. The light measuring circuit 19 is composed by connecting a three terminal combined cell consisting of the photoelectric elements $PC_1$ and $PC_2$, and the variable resistance $VR_2$ in series with the variable resistance $VR_1$. The dividing point of the both above mentioned elements is connected to the transparent electrode 11T of the liquid crystal cell 18. When a single photoelectric element is used instead of the above mentioned three terminal combined cell, the electrical potential at the dividing point varies as is shown in FIG. 11(b) with reference to the logarithm of the amount of the incident light. Hence the linear range is limited to the middle part while in the above mentioned three terminal combined cell in which the resistance value of the photoelectric element $PC_1$ is chosen about ten times as large as that of the element $PC_2$ the electrical potential at the dividing point varies almost linearly, as is shown in FIG. 11(c) in a wide range with reference to the logarithm of the amount of the incident light.

In this way, the electrical potential of the transparent electrode 11T of the liquid crystal 18 varies proportionally to the logarithm of the amount of the incident light. Thus the above mentioned display part 12H moves at an equal distance in proportion to the logarithm of the amount of the incident light. The reason is that in accordance with the variation of the electrical potential of the transparent electrode 11T the range 12H in which the potential difference between the inclination A-B of the electrical potential of the transparent resistance body 10R and the electrical potential of the transparent electrode 11T is below the potential difference twice as high as the threshold voltage Vth is moves in proportion to the amount of the incident light. This means that the display part moves at an equal distance in proportion to the logarithm of the amount of the incident light. Hereby the variable resistance $VR_1$ serves to vary the display position of the liquid crystal optionally while the variable resistance $VR_2$ serves to compensate the deteriorated characteristics of the photoelectric element $PC_2$ when the intensity of the incident light is very small.

As another embodiment of the driving circuit it is thought that the power source circuit 15 in FIG. 11(a) is directly connected to the liquid crystal cell 18 and the light measuring circuit 19. Hence in order to keep the frequency of the AC voltage below several hundred Hz it is necessary to prepare large space in the transformer. This is problematic for the installation in a camera.

Figure 11D:
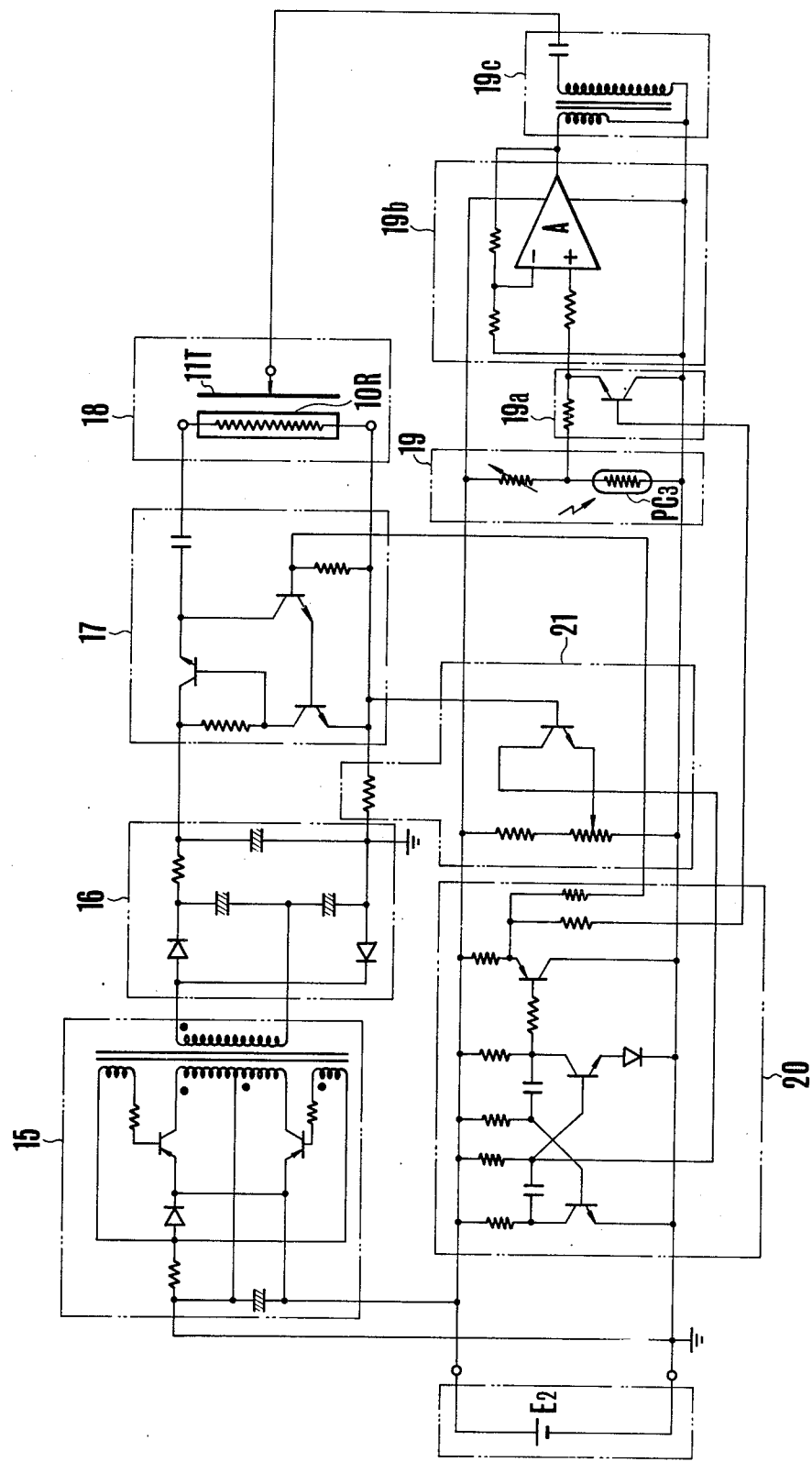

FIG. 11(d) shows further another embodiment of the driving circuit applicable to the present invention. In the drawing 15, 16, 17, 18, 20 and 21 correspond to the elements with same figures in FIG. 11(a). Element 19a is the interrupting circuit for converting the light measuring circuit 19 into the interrupted signal, being synchronously controlled by means of the signal of the pulse generator 20 for driving the high voltage interrupting circuit 17. Consequently at the output of the interrupting circuit a pulse voltage with an amplitude variable in accordance with the light measurement output of the light measuring circuit 19 is produced. 19b is a signal amplifier circuit for amplifying the pulse voltage into such with corresponding amplitude so as to apply to the signal step up circuit 19c. The circuit is composed of a signal transistor allowing the passage of a sufficiently low frequency current. Thus the voltage at the secondary side of the transistor is stepped up at maximum into a voltage to be applied to the resistance body electrode 10R of the liquid crystal cell 18 so as to be applied to the electrode 11T of the liquid crystal cell 18. This circuit has the following merits. Because as shown in FIG. 11(a) the light measuring circuit 19 does not act as the load of the transistor inverter 15 serving as the power source of the liquid crystal cell 18, a transistor inverter 15 with small capacity will do. Thus the inverter 15 can be made very small. Further because the voltage applied to the both terminals of the photoelectric element of the light measuring circuit 19, a photoelectric element with low withstand voltage can be used. In case the above mentioned three terminal correspond cell is used instead of the photoelectric element $PC_3$ of the light measuring 19, the display part 12H moves at an equal distance in proportion to the logarithm of the amount of the incident light as is already explained in accordance with the embodiment of the driving circuit shown in FIG. 11(a).

In case the above mentioned liquid crystal cell for view finder display by means of the above mentioned driving circuit, an accurate light measurement output in proportion to the logarithm of the amount of the incident light can be displayed, whereby in case of the over-exposure or the under-exposure the display part 12H moves to one end of the liquid crystal cell so as to display the over-exposure or the under-exposure alarm display.

Further all of the liquid crystal cells used in the so far explained embodiment are driven by AC voltage so that the adhesion of dust due to static electricity never takes place.

As explained above a display in accordance with the electrical field to be applied in the liquid crystal matter provided nearly at the position of the clear vision is obtained through the eye piece lens while a mask measuring for eliminating other display noises the contents of the display is provided. The invasion of dusts is avoided, there is no fear of the adhesion of dusts due to the static electricity thanks to the AC driving. The display can be made in such a manner that either the display in the display part can be made black or only the display can be made transparent and by arranging the relative polarization direction of a pair of the polarization plates on and under the liquid crystal cell either parallel to each other or perpendicular to each other. Thus in comparison with a mechanical display device the mounting space can be cut small. When the switch of the display part of the liquid crystal cell the display part can be made untransparent so that nothing can be seen. As a result, the photographer can concentrate his attention to the object to be photographed.

Below a finder display device by means of which a large alarm display is obtained when the photographic information value surpasses a certain determined critical value in case the information value is displayed in analog variation by means of the liquid crystal cell will be explained.

Figure 12:
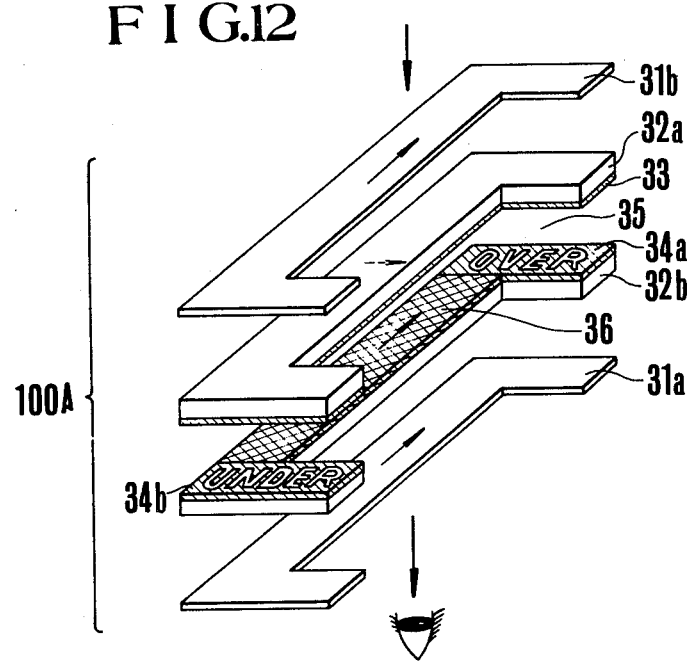
FIG. 12 shows a liquid crystal cell for another display system in dismantled view.

FIG. 12 shows the liquid crystal cell 100A applied to this embodiment in dismantled view. In the drawing, 31a and 31b are the polarization plates presenting the polarization planes along the directions of the arrow shown on the respective polarization plate. Members 32a and 32b are the glass base plates opposed to each other so as to sandwich the liquid crystal. 33 is the transparent electrode provided on the glass base plate 32a. Members 34a and 34b are transparent electrodes provided on the glass base plate 32b, whereby a figure is cut out of the electrode so as to give an alarm display in case of the improper exposure. Element 36 is the transparent resistance body provided on the glass base plate 32b, being provided at the position sandwiched between the transparent electrodes 34a and 34b so as to electrically connect the both electrodes 34a and 34b to each other. A space 35 is to be filled with a nematic liquid crystal with a field effect.

It goes without saying that not only the above mentioned FE type liquid crystal cell but also the DSM type liquid crystal and so on can only be used in the present invention.

Figure 13A:
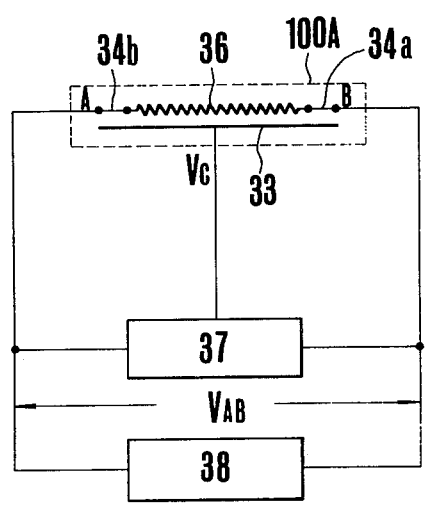
FIGS. 13(a), (b) and (c) respectively show a diagram for explaining the operation of the liquid crystal cell shown in FIG. 12.

FIGS. 13(a), (b) and (c) respectively show a diagram for explaining the operation of the liquid crystal shown in FIG. 12.

Figure 13B:
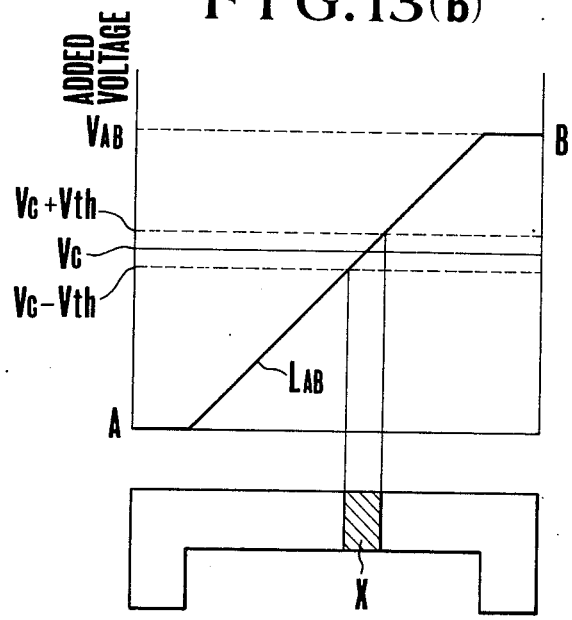
Figure 13C:
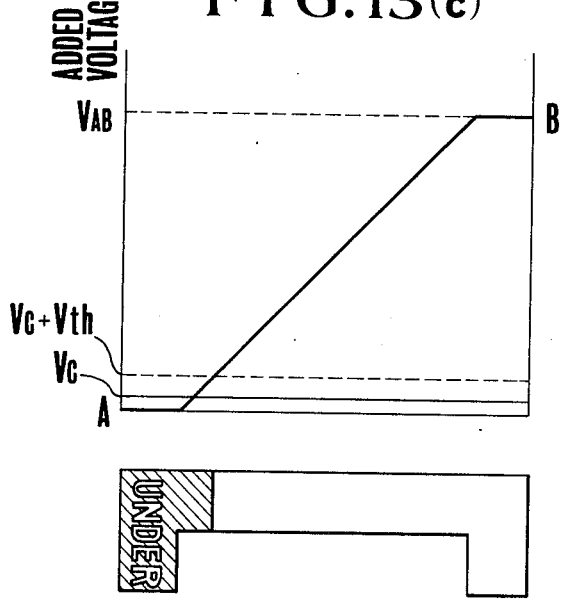

In the electrical circuit shown in FIG. 13(a), the output voltage Vc of the light measuring circuit 37 is applied to the transparent electrode 33 while the voltage VAB of the power source 38 is applied to the external terminals B and A of the transparent electrodes 34a and 34b. At this time, as is shown in FIG. 13(b) an inclination of the potential shown with the folded line LAB is produced between the terminals A and B, while all over the surface of the transparent electrode 3 the output voltage Vc of the light measuring circuit is kept. The range in which the then potential difference surpasses the electrooptical threshold value Vth for operating the liquid crystal is optically modulated so as to allow the passage of the light while the range X in which the potential difference is below Vth is not electrooptically modulated so as to interrupt the passage of the light and to display the measured light value. In accordance with the variation of the voltage Vc of the measured light output the range X moves so as to display the measured light value. When now the brightness of the object to be photographed becomes so dark into an under-exposure the voltage Vc of the measured light output becomes low in such a manner that the part including the transparent electrode 34b is contained in the range X as is shown in FIG. 13(c). Hence the figured part in the drawing permits the passage of the light while the remaining part interrupts the passage of the light so as to give an alarm display.

FIGS. 14(a), (b) and (c) respectively show the display mode in the view finder in case the above mentioned liquid crystal cell 100A is provided on the focus plane of a single reflex camera in the same way as the embodiment shown in FIG. 2.

In FIG. 14(a) the horizontal tape shaped display $X_1$ appearing in the display window 4I beside the finder view field frame 4P of the mask 4 displays the photographic informations such as the brightness of the object to be photographed, the aperture value, the shutter time and so on. Thus a proper exposure can be obtained in the mechanically linked range. Although omitted in the drawing, it is sufficient to arrange the information values as is shown in the embodiment in FIG. 5. In FIG. 14(b), the display $X_2$ displays the over-exposure alarm, while in FIG. 14(c) the display $X_3$ displays the under-exposure alarm.

Figure 15:
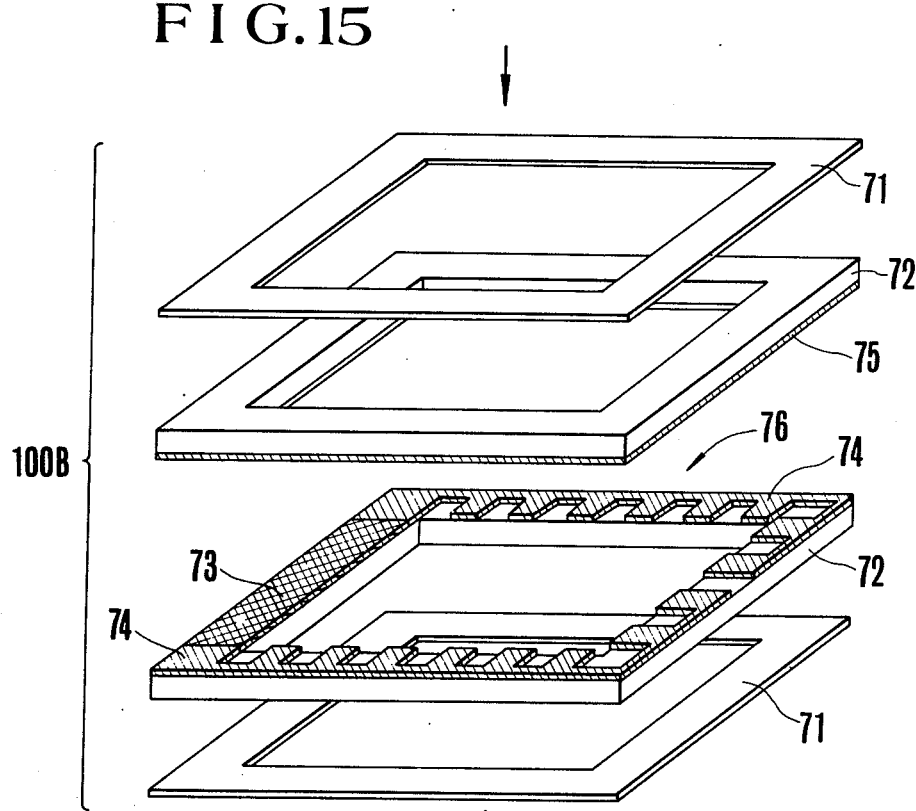
FIG. 15 shows another variation of the liquid crystal cell in dismantled view.

FIG. 15 shows a variation 100B of the liquid crystal cell in dismantled view. This embodiment is so designed that the alarm display appears as key shaped pattern along the contour of the picture plane. In the drawing 71 is the polarization plate, 72 the glass base plate, 75 the transparent electrode, 73 the transparent resistance body, 74 the two transparent electrodes connected to the both ends of the transparent resistance body 73 and 76 the space to be filled with the nematic liquid crystal.

Figure 16:
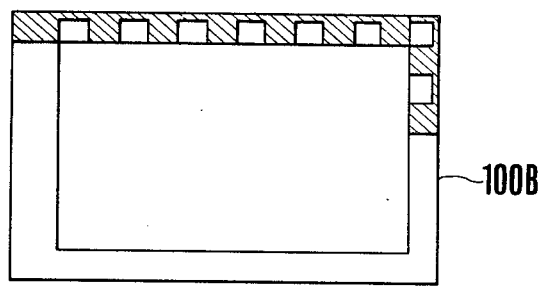
FIG. 16 shows the display mode of the liquid crystal cell shown in FIG. 15.

The above produces a rectangle shaped liquid crystal cell. With this, for example, a display as shown in FIG. 16 can be obtained by means of the transparent electrode 74.

Figure 17:
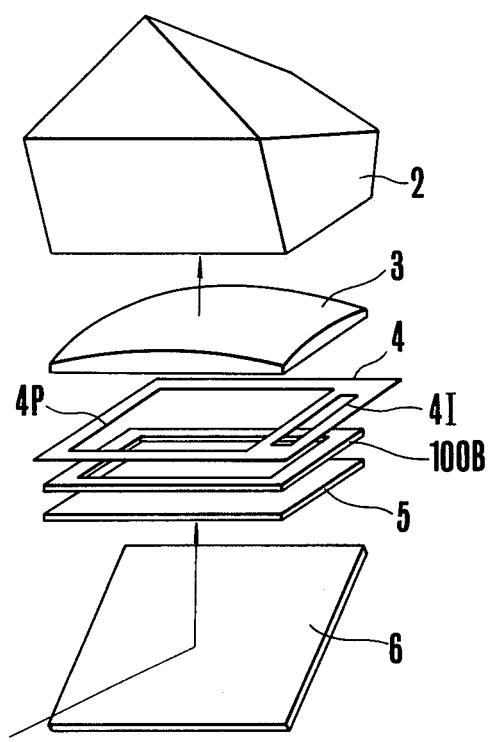
FIG. 17 shows the liquid crystal cell shown in FIG. 15, which is built in a single reflex camera as a view finder display device.

In FIG. 17, the liquid crystal cell shown in FIG. 15 is provided in the view finder optical path of a single reflex camera in the same way as the above mentioned embodiment. In the drawing, 100B is the liquid crystal cell shown in FIG. 15, being arranged on the circumference of the object light beam on the focus plate 5. Element 4 is the mask having a view field frame 4P and the display window 4I, serving to make the finder view field and to prevent the invasion of dust into the view field part, being in close contact between the liquid crystal cell 100B and the condenser lens 3.

Figure 18A:
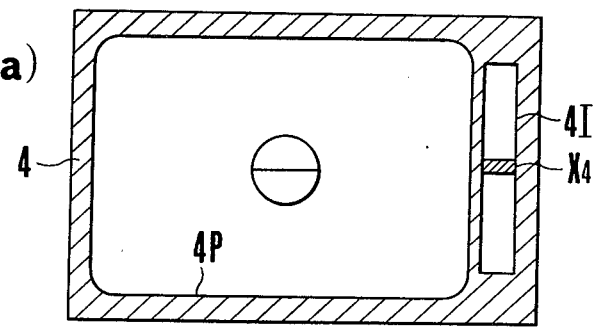
FIGS. 18(a), (b) and (c) respectively show a display mode of the view finder display device shown in FIG. 17.

This embodiment operates in the same way as that of the afore-mentioned embodiment, whereby the display mode in the view finder is shown in FIGS. 18(a), (b) and (c).

Figure 18B:
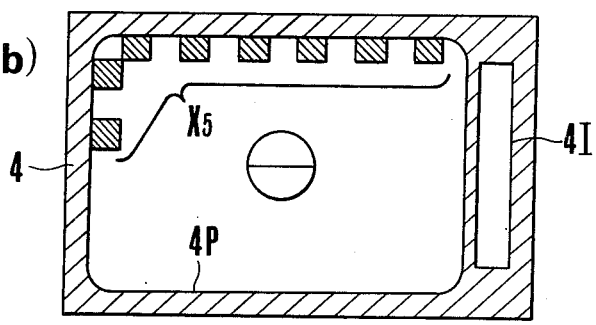
Figure 18C:
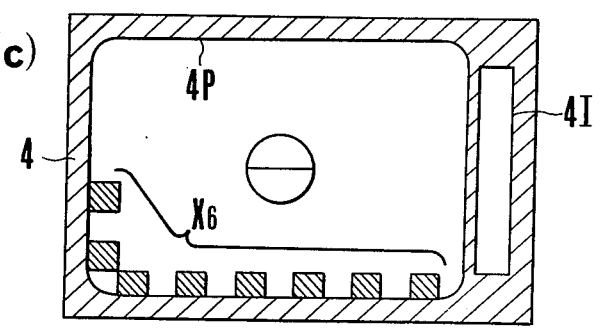

In FIG. 18(a), the horizontal line display $X_4$ in the display window 4P displays the photographic informations, while the proper exposure can be obtained in the mechanically linked range. In FIG. 18(b), the display $X_5$ in the circumference of the finder view field displays the over-exposure alarm. In FIG. 18(c) the display $X_6$ displays the under-exposure alarm.

Figure 19:
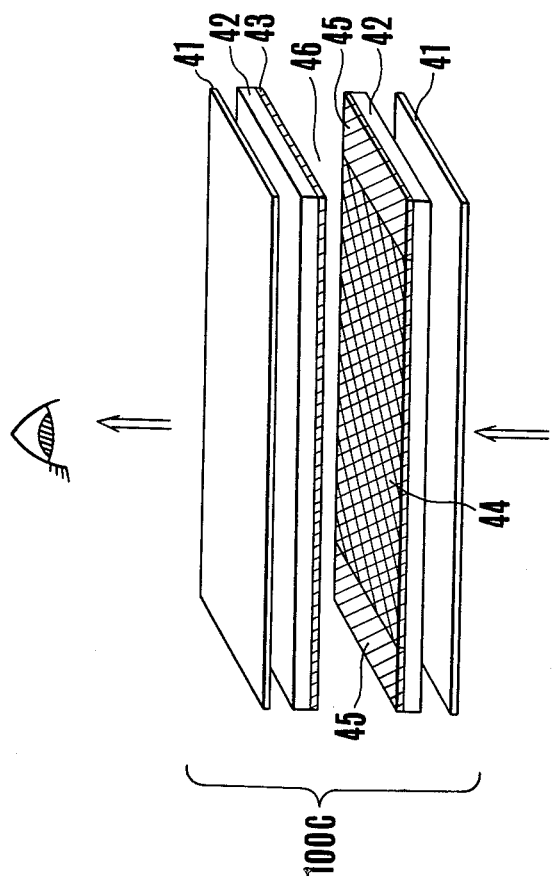
FIG. 19 shows further another variation of the liquid crystal cell in dismantled view.

FIG. 19 shows further another variation of the liquid crystal cell in dismantled view. In this embodiment, the shape of the transparent electrode which is connected the both ends of the transparent resistance body of the liquid crystal cell is composed simple. In the drawing, 41 is the polarization plate, 42 the glass base plate, 43 the transparent electrode, 44 the transparent resistance body and 45 the transparent electrode arranged in contact with the both ends of the transparent resistance body 44. Thus the shape of the transparent electrode 45 is simply rectangular.

Figures 20A, 20B, 20C:
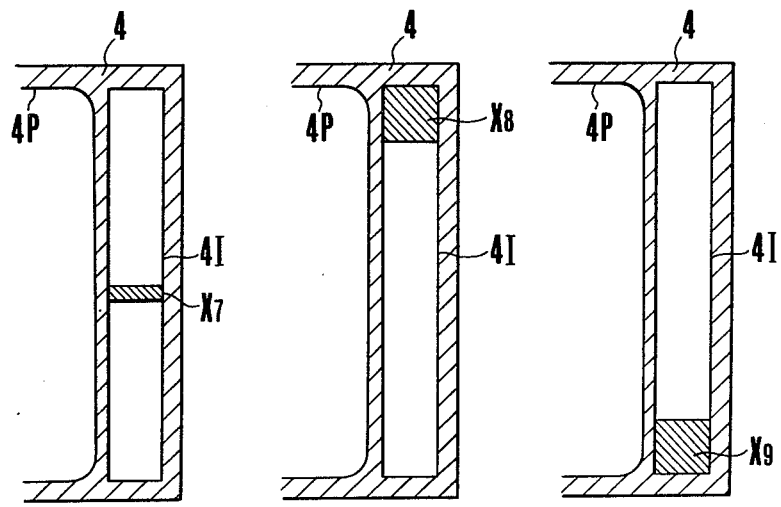
FIGS. 20(a)–(f) respectively show a display mode of the liquid crystal cell shown in FIG. 19 which is built in a single reflex camera as a view finder display device.

The liquid crystal cell 100C operates in the same way as the liquid crystal cell 100A, 100B applied to the afore mentioned embodiments. When this liquid crystal cell 100C is provided beside the focus plate in the view finder optical path of the single reflex camera, the finder view field mode becomes as is shown in FIGS. 20(a), (b), (c), (d), (e) and (f). In this FIG. 20(a), the horizontal line display $X_7$ in the display window 4I displays the photographic informations, whereby the proper exposure can be obtained in the mechanically linked range. In FIG. 20(a), the display $X_8$ at the upper end of the display window corresponding to the transparent electrode 45 displays the overexposure alarm. This display $X_8$ is wider than the above mentioned display $X_7$, so that the former can be distinguished from the latter. In FIG. 20(c) the display $X_9$ displays the under-exposure alarm in the same way. At this time, it is possible to give color to the display part so as to obtain an easy observation by providing a color filter in front of the liquid crystal cell or color polarization plates combined with the liquid crystal cell.

Figures 20D, 20E, 20F:
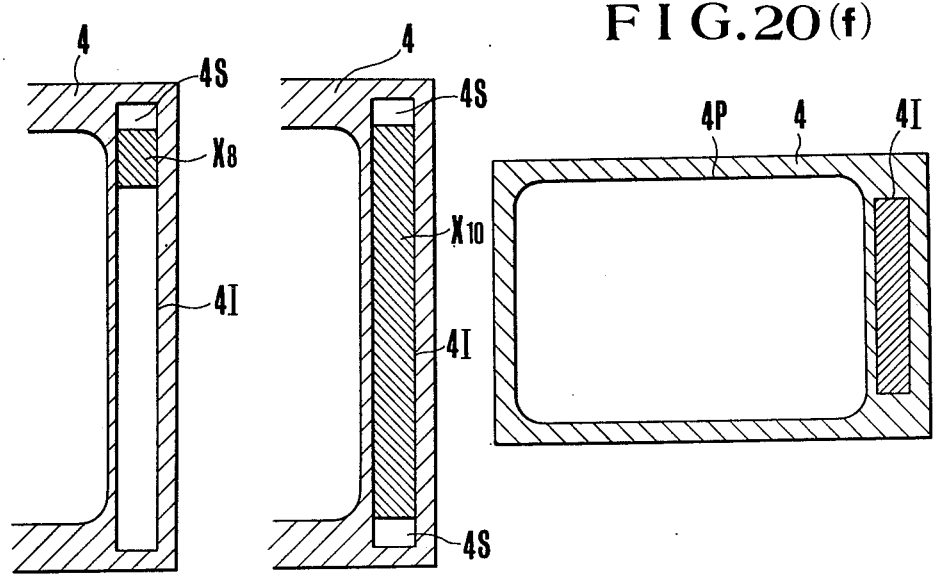

In FIG. 20(d), the display window 4I is made a little longer in such a manner that the transparent parts 4S remain outside of the display when an alarm is displayed so as to be able to distinguish the display $X_8$ from the dark part on the mask plane in the view finder. FIG. 20(e) shows the mode of the display window when the power source switch is open. Thus all the parts corresponding to the transparent resistance body 44 and the transparent electrode 45 do not allow the passage of the light so as to alarm that the power source is switched off. When no light transmitting part remains at the upper and the lower end of the display window a display mode as is shown in FIG. 20(f) is obtained when the power source is switched off. Hence the display window becomes totally dark so that at the time of taking a photograph the photographer can concentrate all of his attention to the composition of the picture, being undisturbed with useless displays.

Figure 21:
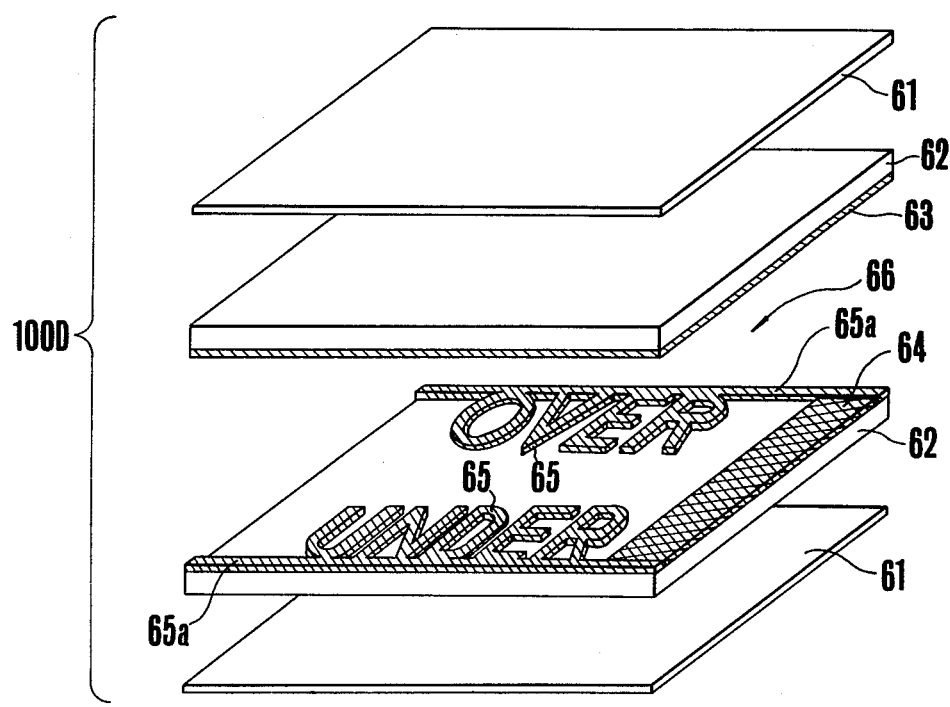
FIG. 21 shows further another variation of the liquid crystal cell in dismantled view.

FIG. 21 shows further another variation of the liquid crystal cell in dismantled view. In this embodiment, the liquid crystal display covers total light beam in the view finder optical path whereby the large alarm display is obtained in the finder view field frame. In the drawing, 61 is the polarization plate, 62 the glass base plate, 63 the transparent electrode cemented all over the glass base plate, 64 the transparent resistance body and 65 the two transparent electrodes arranged in contact with the both ends of the transparent resistance body whereby both present the figure shaped form for the alarm display.

Figure 22A:
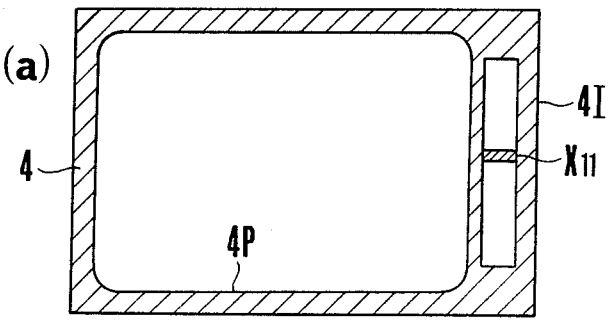
FIGS. 22(a), (b) and (c) respectively show a display mode of the liquid crystal cell shown in FIG. 21, which is built in a single reflex camera as a view finder display device.
Figure 22B:
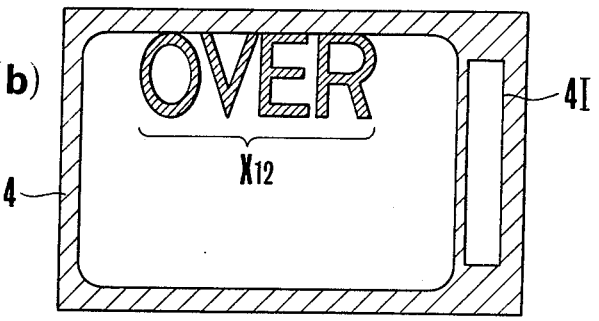
Figure 22C:
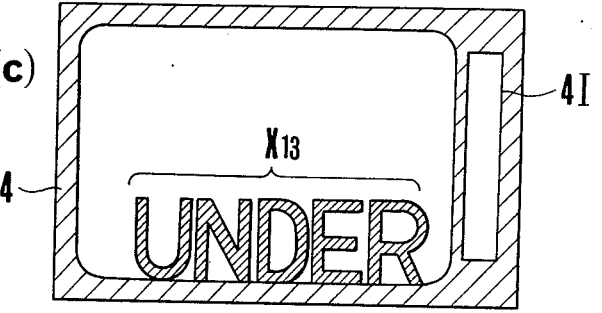

FIGS. 22(a), (b) and (c) respectively show the display mode when the above mentioned liquid crystal cell 100D is arranged in the view finder optical path of a single reflex camera, and combined with a mask in the same way as in case of the embodiment shown in FIG. 17. In FIG. 22(a), the horizontal line display $X_{11}$ in the display window displays the photographic informations, whereby the proper exposure can be obtained in the mechanically linked range. In FIGS. 22(b) and (c) the large display $X_{12}$ or $X_{13}$ appears in the view field frame 4P so as to alarm the improper exposure.

Because thus the mask 4 having the display window 4I and the view field frame 4P the information values are displayed in the display window when the proper exposure can be obtained, while the alarm figures at the time of the improper exposure the part excepting the part 65a for wiring of the transparent electrode 65 so as to otain a clear vision.

In this embodiment the polarization plates may be arranged in the upper and the lower position so as to cover the part excepting the part 65a for wiring of the figure shaped transparent electrode 65. However even if the figure part is arranged near the center of the view field, and not in contact with the view field frame only the figure part excepting the part for wiring can be displayed near the center of the view field at the time of the alarm display.

Below a view finder display device whose display part repeats the transparent state and the untransparent state at the time of alarm display to make an impressive alarm display will be explained. Hereby the same liquid crystal as is shown in FIG. 1 can be applied. FIG. 23 shows the circuit diagram for explaining the principle of this alarm system. In the drawing, $E_3$ is the power source battery. $SW_4$ is the periodically interrupting switch serving to periodically produce the potential inclination in the transparent resistance layer 78. The transparent electrode layer 77 is under the constant voltage, being kept at the earth potential in this case. When the switch $SW_4$ is closed the untransparent part as $X_{21}$ appears only at the one end of the liquid crystal cell, while the switch $SW_4$ is opened the liquid crystal cell does not operate whereby the untransparent part as $X_{22}$ appears all over the plane. The alarm is display in such a manner that the above mentioned two modes appears one after another at the visible speed.

Figure 25:
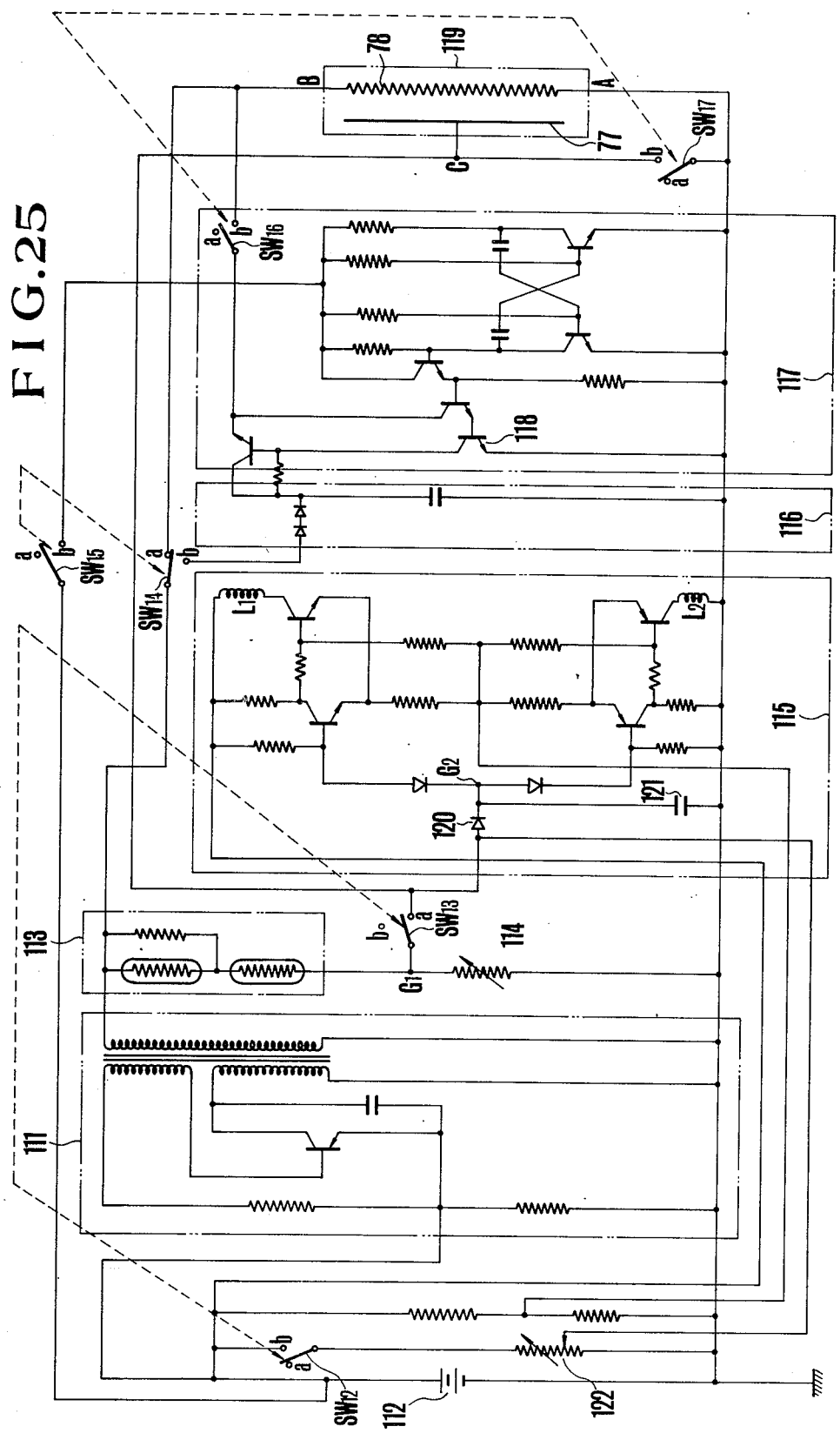
FIG. 25 shows an embodiment of the circuit shown in FIG. 23.
Figure 26:
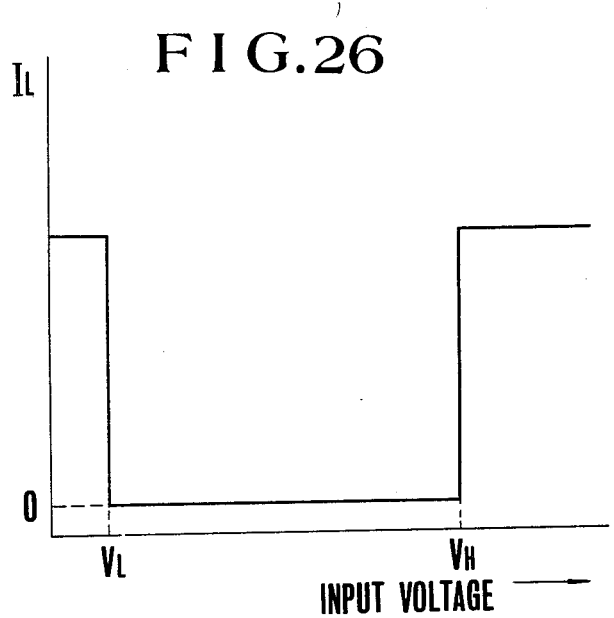
FIG. 26 shows a diagram for explaining the operation of the circuit shown in FIG. 25.

FIG. 25 shows the electrical circuit diagram of an embodiment of the device for carrying out the above mentioned alarm display. This embodiment is suited for the automatic exposure controlled camera with priority on shutter time or on aperture value. Hence the proper aperture value or the proper aperture value basing upon the measured value of the brightness of the object to be photographed is displayed. The alarm is also displayed when the proper exposure can be obtained with the preset shutter time or the preset aperture value or where there is a fear for an unstable camera holding by the hand. Thus by changing over the switch the voltage of the power source as well as the consumption of the power source can be display as alarm. In FIG. 25, 112 is the power source voltage. The block 111 the step up circuit consisting of a transistor inverter serving to convert the D.C. of the battery into an A.C. to be stepped up. The block 113 is the three terminal photoconductive element CdS on which the light from the object to be photographed is incident. 114 is the variable resistance, at which the ASA sensitivity of the film, the preset shutter time or the preset aperture value is put. Consequently the electrical potential at the point G1 differs in accordance with the brightness of the object to be photographed and the set conditions at the side of the camera. $SW_{12}$ and $SW_{13}$ are the manual switches mechanically linked with each other. The block 115 is the voltage level detecting circuit with bipolarity, being closed when the input voltage is below the low threshold value VL or above the threshold value VH. Namely the coil L1 is excited when the input voltage is below VL, while the coil L2 is excited when the input voltage is above VH. The switches $SW_{14}$, $SW_{15}$, $SW_{16}$ and $SW_{17}$ are the relay switches to be opened and closed in functional engagement with the above mentioned coils L1 or L2 in such a manner that when either the coil 1 or the coil 2 is excited all of the switches $SW_{14}$, $SW_{15}$ and $SW_{16}$ are connected to the side of b. The block 116 are the rectifying circuit, serving to rectify the half waves of the A.C. from the step up circuit 111 into D.C. The block 117 is the low frequency oscillation circuit including a multi-vibrator, whereby the transistor 18 is switched on or off in accordance with the frequency of the multi-vibrator so that a low frequency oscillation voltage with nearly rectangular wave form is obtained from the half wave rectified current. Member 119 is the liquid crystal cell.

In operation, when the display based upon the measured value of the brightness of the object and the alarm are carried out, the switches SW12 and SW13 are set at the side of a. The A.C. output voltage of the step up circuit 111 is divided by means of the photoconductive element 113 and the information input resistance 114 and appears at the point G1. In case now the brightness of the object to be photographed is in a range in which the proper exposure can be obtained, the voltage appearing at the point G2, half wave rectified by means of the diode 120 and the condenser 121 in the detecting circuit 115 is between the low threshold value VL and the high threshold value VH so that no current flows through L1 and L2 in such a manner that the switches SW14, SW15, SW16 and SW17 are all connected to the side of a. Consequently, the A.C. output voltage of the step up circuit 111 are applied to the both ends A and B of the transparent resistance layer 78 of the liquid crystal cell 119 so as to establish an inclination of the electrical potential. The transparent electrode layer 77 now assumes the same electrical potential as at the point G1 in such a manner that by means of the liquid crystal cell 119 the value corresonding to the brightness of the object to be photographed, the shutter time value or the aperture value operated out of the brightness of the object to be photographed and the preset value so as to obtain the proper exposure is displayed. In this way, the photographic informations are displayed in an analog way by means of the liquid crystal cell when they are in the range in which the proper exposure can be obtained.

When on the other hand, the brightness of the object to be photographed is too high or too low for the preset shutter time or the preset aperture value to get the proper exposure, the voltage appearing at the point G2 is higher than the high threshold value VH or lower than the low threshold value VL. Thus a current flows through the coil L1 or L2 in such a manner that the switches SW14, SW15, SW16 and SW17 are connected to the side of b. Consequently, the A.C. output of the step up circuit 111 is supplied to the rectifier circuit 116 through the switch SW14 so as to actuate the low frequency oscillation circuit 117 whose output voltage is applied to the transparent resistance layer 78 of the liquid crystal cell 119. Because at this time, the transparent electrode layer 77 is at the earth potential through the switch SW7, the display plane of the liquid crystal cell assumes the transparent state and the untransparent state periodically as mentioned above. The period is that of the multi-vibrator and the visible speed.

As explained above the constants of the voltage level detecting circuit are chosen in such a manner that when the photographic informations are in the range in which the proper exposure can be obtained the electrical potential at the point G2 is between the low threshold value VL and the high threshold value LH of the voltage level detecting circuit 115. Consequently the above mentioned alarm display is automatically carried out when the photographic data are out of the range in which the proper exposure can be obtained. It goes without saying that by properly choosing the circuit constants the alarm for the unstable manual holding of camera for the long exposure time can be carried out in case of the automatic exposure camera with priority on aperture value.

To check the power source, the switches SW12 and SW13 are changed over to the side of b. In this state, the voltage of the power source 112 is, instead of the electrical potential at the point G1 as the light measurement information, applied to the voltage level detecting circuit 116 through the switch SW12 and the variable resistance 122. The operation after this is as follows. When in the same way as in case of the above mentioned photographic informations the applied voltage is between the low threshold value VL and the high threshold value LH a line shaped display in accordance with the power source voltage is carried out by means of the liquid crystal cell 119 in such a manner when the voltage of the consumed battery is lower than the threshold value VL the periodical alarm display is made.

Figure 27A:
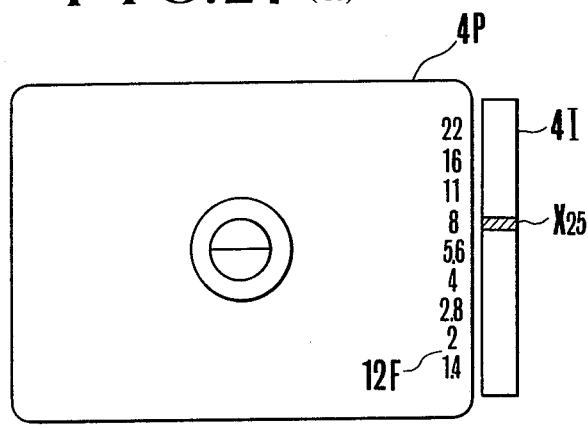
FIGS. 27(a) and (b) respectively show a display mode of the liquid crystal cell which is built in a single reflex camera as a view finder display device and driven by means of the circuit shown in FIG. 25.
Figure 27B:
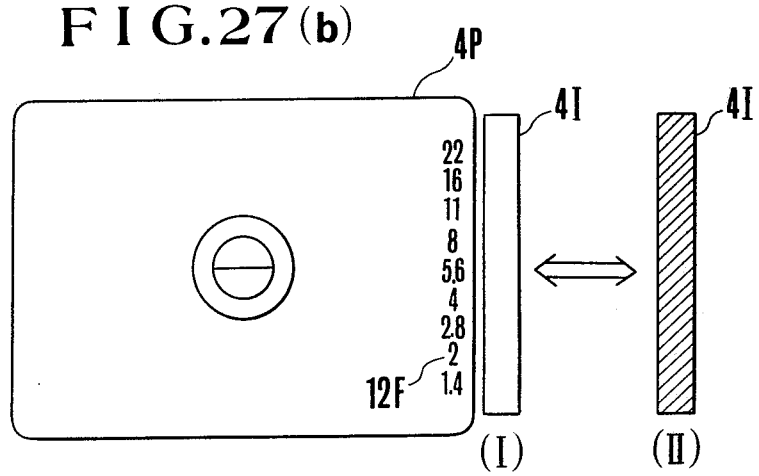

FIGS. 27(a) and (b) respectively show a display mode in the view finder when the above mentioned liquid crystal cell is built in the view finder optical system in a single reflex camera in the same way as in case of the embodiment shown in FIG. 2. In FIG. 27, 4P is the view field frame, 4I the display window, 25 the untransparent display and 12F the line of figures of the aperture value provided on the upper side of the focus plate. FIG. 27(a) shows that the proper exposure can be obtained with the preset shutter time. Here, the proper aperture value is 8. FIG. 27(b) shows the state of the alarm display, whereby in the display window 4I the transparent state (I) and the untransparent state (II) appears one other another. Because the display window 4I of the mask is made a little smaller than the liquid crystal cell, at this time the untransparent part at the end of the liquid crystal cell in the state (I) can not been seen in the display window.

Figure 28:
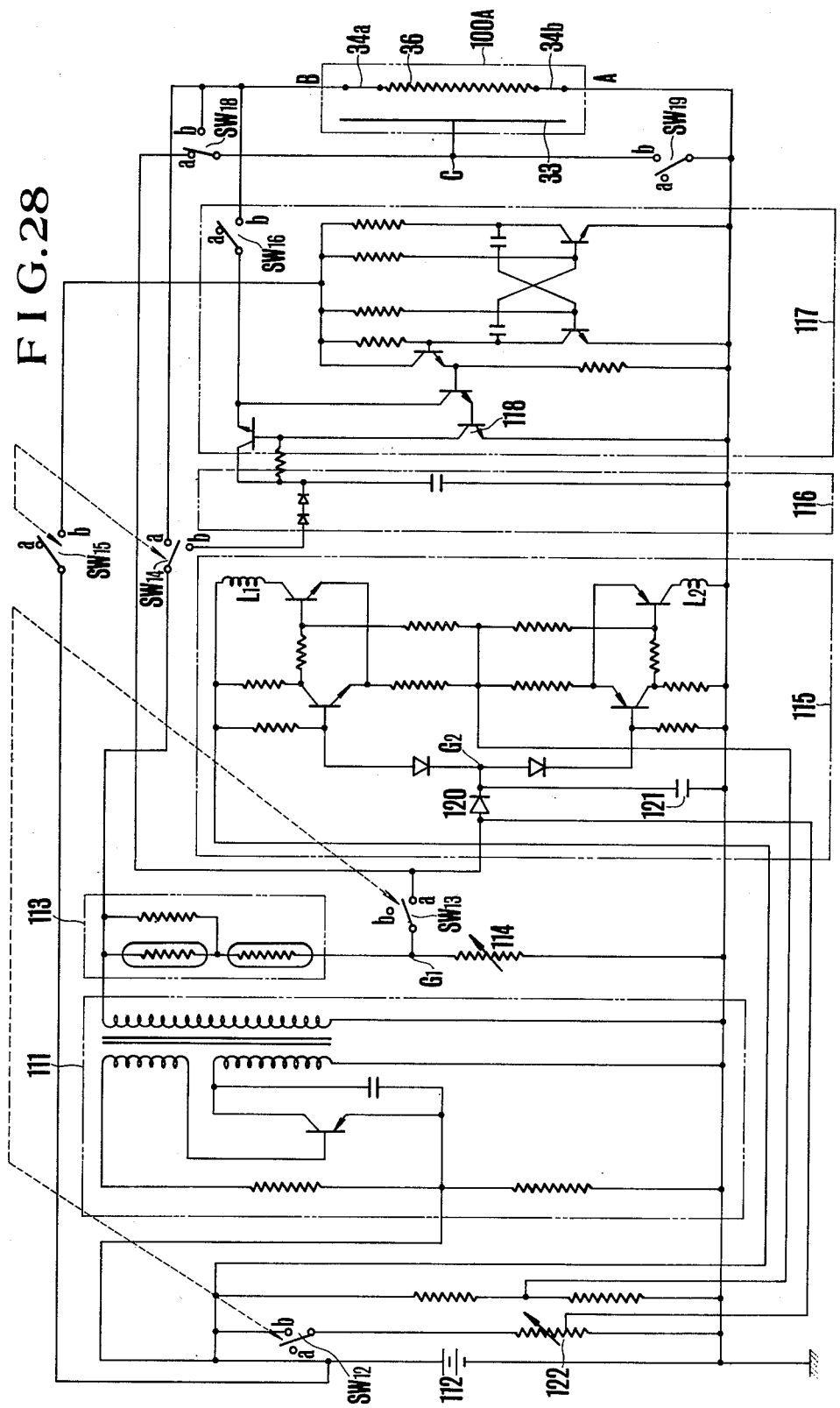
FIG. 28 shows a circuit diagram of further another embodiment.

According to another embodiment the over-exposure and the under-exposure can be displayed at the time of the exposure alarm display. In case of this embodiment the liquid crystal cell 100A shown in FIG. 13(a) is applied. FIG. 28 shows the electrical circuit diagram. This circuit is so designed that a switch SW18 is added to the circuit shown in FIG. 25 and a switch SW19 is provided instead of the switch SW17. The switch SW18 is a relay switch mechanically linked with the coil L2 in such a manner that the switch SW18 is charged over to the side of b when a voltage higher than the high threshold value VH is applied to the point G2 of the voltage level detecting circuit 115, so as to keep the transparent electrode layer 33 of the liquid crystal cell 100A at a high electrical potential. Further the switch SW19 is a relay switch mechanically linked with the coil L1 in such a manner that the switch SW19 is changed over to the side of b when a voltage lower than the low threshold value VL is applied to the point G2 of the voltage level detecting circuit 115. This keeps the transparent electrode layer 33 at ground potential. Other parts of this circuit are same as shown in FIG. 25.

Figure 29A:
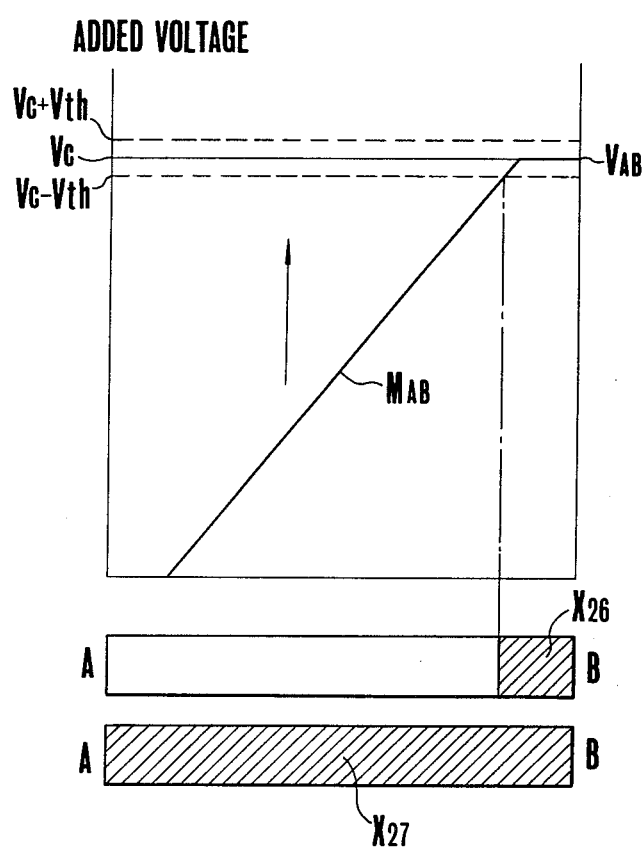
FIGS. 29(a) and (b) respectively show a diagram for explaining the circuit shown in FIG. 28.
Figure 29B:
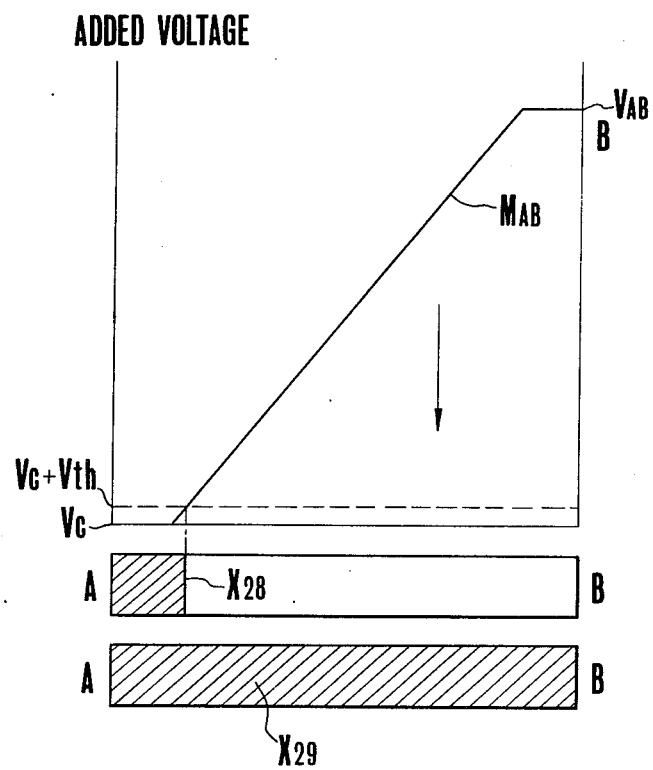

FIGS. 29(a) and (b) respectively show a diagram for explaining the operation of the circuit shown in FIG. 28. When the voltage VAB is applied between the both ends A B of the electrode of the liquid crystal cell 100A, on the side on which the transparent resistance layer 36 and the transparent electrode layers 34a and 34b are provided, an inclination of the potential difference appears as is shown by the folded line MAB. When a voltage higher than the threshold value VH is now applied to the point G2 of the voltage level detecting circuit 115 a current flows through the coil L2. Thus the switches SW14, SW15, SW16 and SW18 are changed over to the side of b. Consequently the transparent electrode layer 33 is kept at a high electrical potential Vc as is shown in FIG. 29(a), an untransparent display as X26 including the part of the transparent electrode 34a appears in the liquid crystal cell 100A. However, in the same way as in case of the embodiment shown in FIG. 25 the low frequency oscillation circuit is operating. Hence the display X26 and the display X27 appear one after another periodically. When on the other hand, a voltage lower than the low threshold value VL is applied to the point G2 of the voltage level detecting circuit 115, a current flows through the coil L1 so that the switches SW14, SW15, SW16 and SW17 are changed over to the side of b. Consequently the transparent electrode layer 33 is kept at a low electrical potential Vc as is shown in FIG. 29(b) so that an untransparent display as X28 including the part of the transparent electrode 34b appears in the liquid crystal cell 100A. The low frequency oscillation circuit is operating at this time also, the display X28 and the display X29 are made one after another periodically. Further when a voltage between the low threshold value VL and the high threshold value LH is applied to the point G2 of the voltage level detecting circuit 115, no current flows through the coils L1 and L2. Thus, the switchs SW14, SW15, SW16, SW17 and SW18 are all changed over to the side of a, in such a manner that in the same way as in case of the above mentioned embodiment an analog display is carried out by means of the transparent electrode layer 33 and the transparent resistance layer 36 of the liquid crystal cell 100A.

Figure 30A:
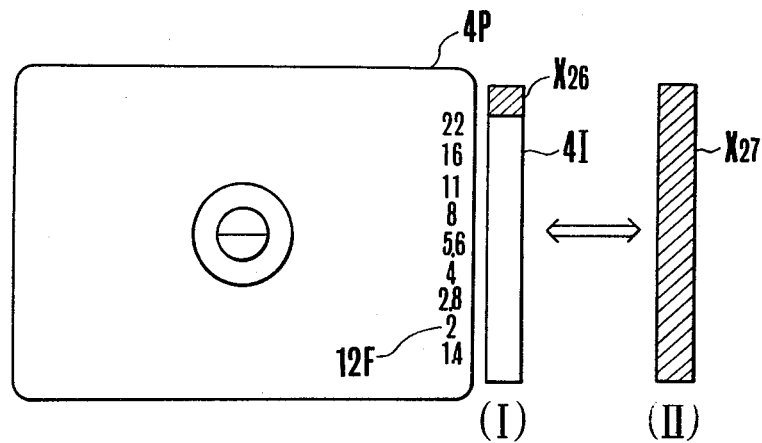
FIGS. 30(a) and (b) respectively show a display mode of the liquid crystal cell which is built in a single reflex camera as a view finder display device and driven by means of the circuit shown in FIG. 28.

FIGS. 30(a) and (b) respectively show a display mode in the view finder when the liquid crystal cell is built in a camera in the same way as in case of the above mentioned embodiment. At the time of the over-exposure the untransparent parts X26 and X27 appears one after another in the display window 4I as is shown in FIG. 30(a) so as to give alarm. Hence the untransparent part X26 displays the over-exposure alarm. At the time of the under-exposure the untransparent parts X28 and X29 appears one after another in the display window 4I as is shown in FIG. 30(b), so as to give alarm, whereby the untransparent part X28 displays the under-exposure.

Figure 30B:
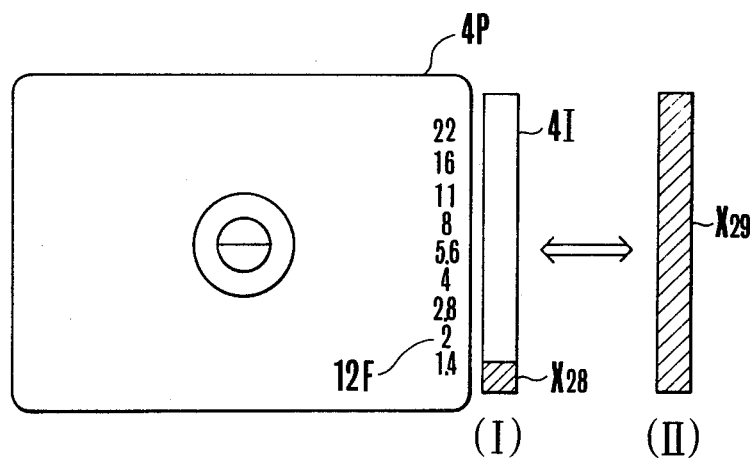

In case of this embodiment the battery can be checked in the same way as in case of the above mentioned embodiment, whereby when the battery is consumed, the same alarm as is shown in FIG. 30(b) is displayed in the view finder.

Figure 31:
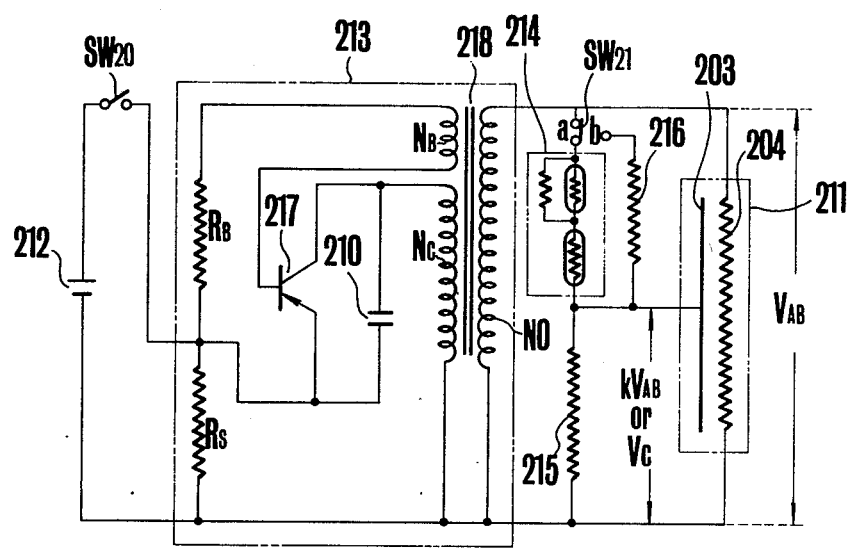
FIG. 31 shows a circuit diagram of a battery alarm display device in accordance with another system.

Below the battery alarm display device by means of a liquid crystal cell in accordance with another principle will be explained. The liquid crystal as is shown in FIG. 1 is applied to this principle. FIG. 31 shows the circuit diagram of an embodiment of this battery alarm display device. In this embodiment the liquid crystal cell for the battery alarm serves for the light measurement display for the camera at the same time whereby the battery can also be checked at any time by changing over the switch. In FIG. 31, 211 is the liquid crystal cell, 212 the power source battery, 213 the step up circuit and 214 the three terminal light sensing element for sensing the light of the object to be photographed. 215 and 216 are the fixed resistances, SW20 the power source switch, SW21 the change over switch. The above mentioned step up circuit 213 consists of the transistor inverter, whose operation principle is as follows. When the power source switch SW20 is closed, a current flows through the coil Nc of the transformer through the condenser 210. The voltage then induced in the coil NB now brings the transistor 217 in the switched on state. The collector current corresponding to the base current controlled by means of the base resistance R13 is limited below a certain determined value so that the core looses the magneto-motive force in such a manner that the voltage in the coil Nc disappears suddenly. Consequently the transistor 217 is switched off quickly, whereby at the next moment by means of the energy stored in the transformer 218 the transistor 217 is biased again in order. By repeating this operation an A.C. voltage VAB corresponding to the turn ratio is produced in the output coil $N_o$ of the transistor 218.

Figure 32:
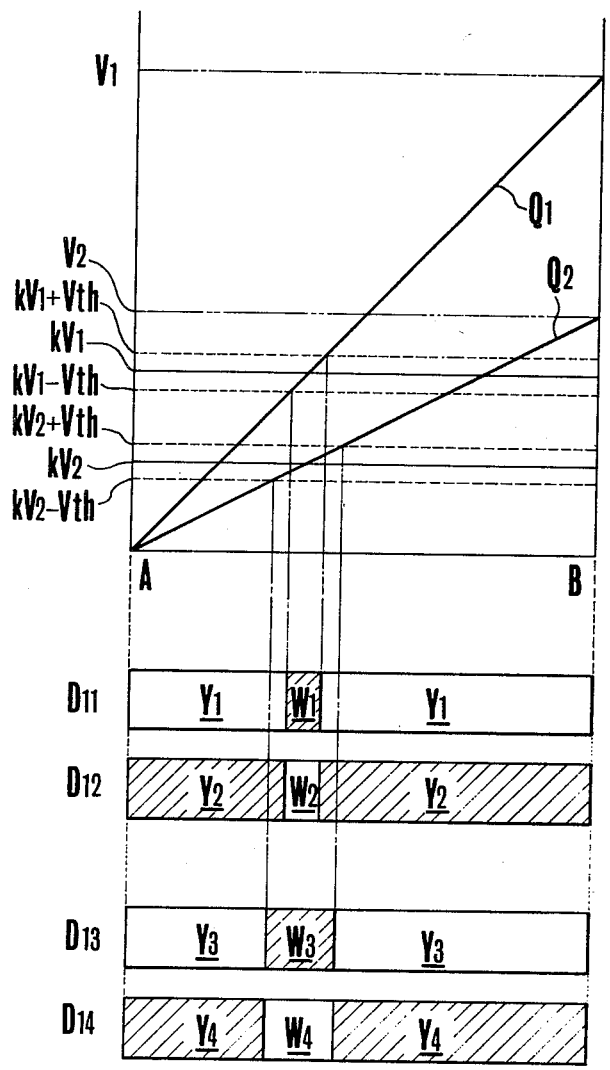
FIG. 32 shows a diagram for explaining the operation of the device shown in FIG. 31.

FIG. 32 shows a diagram for explaining the principle for giving a battery alarm by means of the device shown in FIG. 31. As is shown in FIG. 32, when a voltage V1 is applied to the both end of the transparent resistance layer 204 of the liquid crystal cell an inclination of the electrical potential represented by a line Q1 takes place on the transparent resistance layer 204. When on the other hand, a voltage KV1 ($0 < K < 1$) is applied to the transparent electrode layer 203 the electrode 203 is kept at the voltage KV1 all over the layer. Thus the range Y1 in which the potential difference for operating the liquid crystal is higher than the electrooptical threshold value Vth is optically modulated as mentioned above so as to allow the passage of the light. The range in which the potential difference is lower than Vth is not optically modulated so as to interrupt the passage of the light. This produces a display such as D11. When now the voltage applied to the transparent resistance layer 204 lowers down to V2 the inclination of the electrical potential on the transparent resistance layer 204 becomes dull as is shown by Q2 whereby the electrical potential on the transparent electrode layer 203 becomes KV2. At this time, consequently, a wide untransparent range W3 as D13 appears so as to alarm the consumption of the battery. The ranges W1 and W3 have a common central position so that if an index with standard width for the unconsumed battery is provided here, the consumed degree of the battery is clearly displayed.

As explained above, when the polarization direction of the upper polarization plate is made perpendicular to that of the lower polarization plate, the transparent and the untransparent range are exchanged for each other so that instead of D11 and D13 the display like D12 and D14 are obtained. At this time for example, by means of enlarging the transparent range W2 up to W3 the device can be designed in such a manner that the alarm mark covered with the untransparent range Y2 can be visually recognized.

The embodiment shown in FIG. 31 and FIG. 32 operates as follows. When the battery is checked, the switch SW21 is changed over to the side of b. When the power source switch SW20 is closed the step up circuit 213 operates in such a manner that the A.C. output voltage VAB is applied to the transparent resistance layer 204 of the liquid crystal cell 211. Further the voltage VAB is divided by means of the resistances 215, 216 in such a manner that KVAB ($0 < K < 1$) is applied to the transparent electrode layer 203. When at this time, the voltage of the power source battery is sufficiently high a high voltage V1 can be obtained from the step up circuit accordingly so that a narrow untransparent range W1 is displayed as is shown by D11 in FIG. 32. When the power source battery is consumed and the output voltage is lowered, only a low voltage V2 can be obtained from the step up circuit 213 accordingly so that a wide untransparent range W3 as is shown by D13 in FIG. 32 is displayed for alarm.

When on the other hand, the device is used as the light measurement display, the switch SW21 is changed over to the side of a. At this time also the output voltage VAB of the step up circuit 213 is applied to the transparent resistance layer 204 of the liquid crystal cell 211. The voltage Vc applied to the transparent electrode layer 203 at this time varies in proportion to the logarithm of the amount of the light incident on the light sensing element 214. The untransparent range displayed by mean of the liquid crystal cell 211 corresponds to the amount of the incident light.

As explained above in accordance with the above mentioned embodiment the battery alarm and the measured light value are displayed by means of the same liquid crystal cell. Further the A.C. voltage from the step up circuit is applied to the liquid crystal cell so that the durability of the cell itself is improved.

Figure 33A:
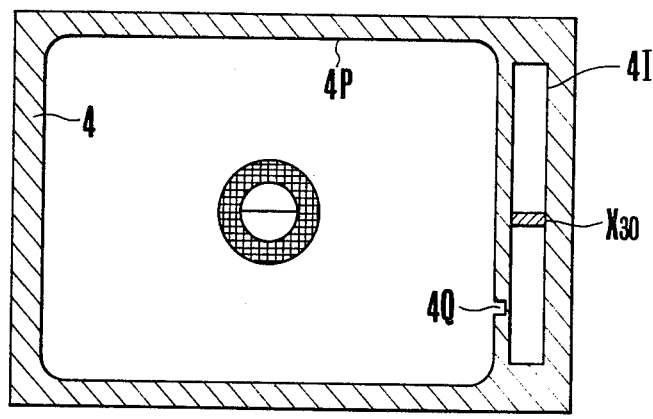
FIGS. 33(a), (b) and (c) respectively show a display mode of the device shown in FIG. 31.

FIGS. 33(a), (b) and (c) respectively show a display mode in the view finder when the above mentioned embodiment is built in the view finder of a single reflex camera in the same way as in the embodiment shown in FIG. 2. In the drawing, 4P is the view field frame, 4I the display window, X30, X31 and X32 the untransparent displays of the liquid crystal cell and 4Q the index notch provided in the mask 4 for showing the standard width for the above mentioned battery alarm, also capable of serving as the fixed point for actual diaphragm driving light measurement.

Figure 33B:
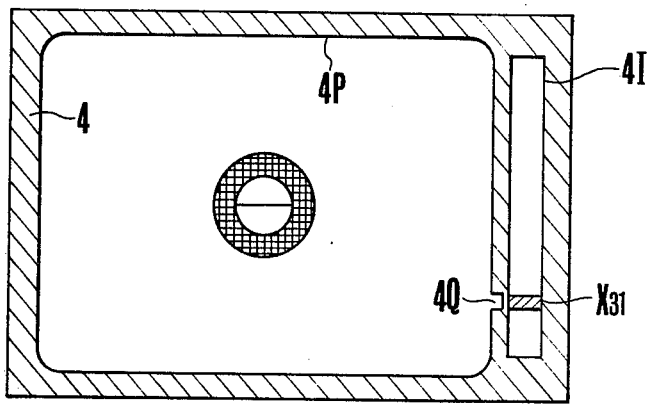
Figure 33C:
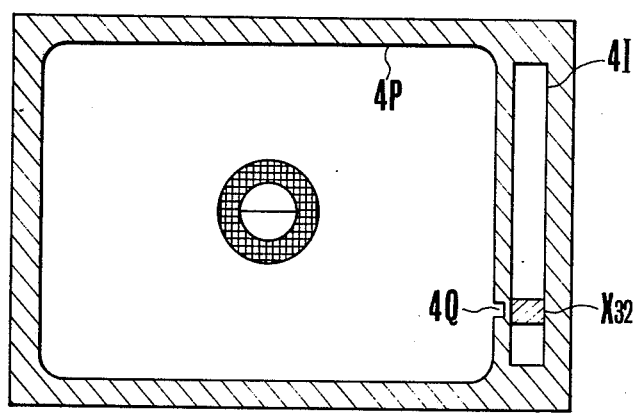

FIG. 33(a) shows the case of the measured light display, whereby the untransparent display X30 moves in the display window 4I so as to make a display in accordance with the measured light value. FIG. 33(b) shows the mode at the time of the battery check whereby the setting is made in such a manner that the untransparent display X31 comes beside the index 4Q in accordance with the set value of the above mentioned resistances 215 and 216. When the width of the display X31 is narrower than that of the index 4Q, it means that the power source battery can properly be used. When the power source battery is consumed the width of the untransparent display X32 is wider than that of the index 4Q as is shown in FIG. 33(c) so as to give alarm.

In this way, the untransparent display at the time of the battery check always appears beside the index 4Q, whereby further the width of the index 4Q is set at the width of the untransparent display when the voltage of the power source battery is suited for operating the circuit of the camera in order in such a manner that the battery checking can be carried out clearly while no inferior influence is given to the light measurement of the camera or the film because no illuminating element such as LED is used. Further when the above mentioned liquid crystal cell carries out the light measurement display, the consumption of the power source battery is judged by the fact that the width of the untransparent display X30 widens in accordance with the same principle as in the battery check.

Figure 34:
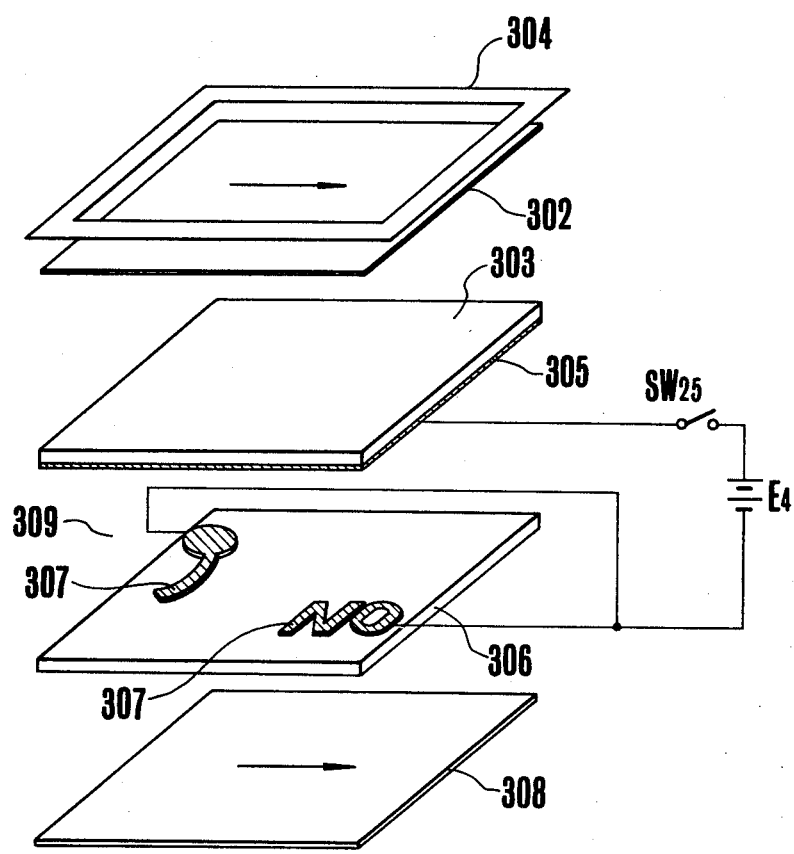
FIG. 34 shows a composition of another view finder display device.

Below a device by means of which a large alarm is displayed in the finder view field independent of the analog display will be explained. FIG. 34 shows the composition of an embodiment of this device, whereby a large alarm is displayed in the view finder when the shutter has been charged. In the drawing 304 is the mask, 302 and 308 the polarization plates, and 303 the glass base plate on which a transparent electrode 305 is provided. 306 is also a glass base plate on which a transparent electrode 307 with the shape for alarm display is provided. 304 is the space to be filled with the liquid crystal. E4 is the power source, SW25 the switch to be opened when the shutter has not yet been charged and to be closed when the shutter has been charged.

Figure 35A:
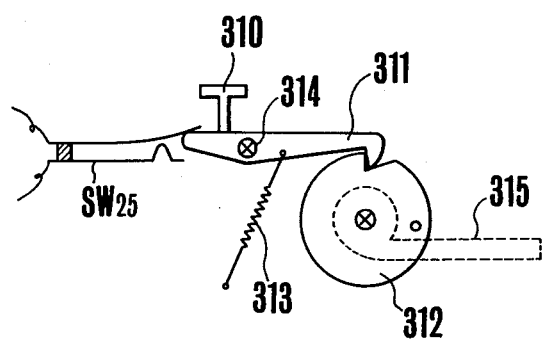
FIGS. 35(a) and (b) respectively show an example of the switch shown in FIG. 34.
Figure 35B:
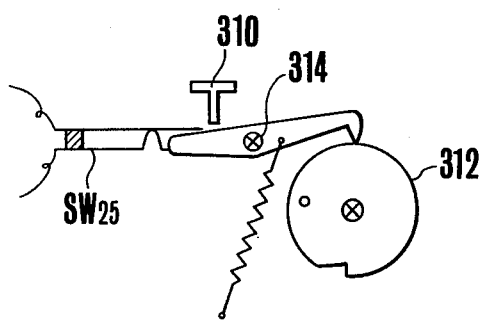

FIGS. 35(a) and (b) respectively show details of the above mentioned switch SW25. FIG. 35(a) shows the mode when the shutter has been charged, while FIG. 35(b) shows the mode when the shutter has not been charged. In these drawings, 310 is the release lever, 311 the holding claw rotatable around the shaft 314 as center, 312 the shutter disk for driving the focal shutter plane not shown in the drawing and 315 the release lever.

In operation of FIG. 34 and FIG. 35, when the shutter has been charged as is shown in FIG. 35(a) the switch SW25 is opened so that no voltage is applied to the liquid crystal whereby no alarm is displayed in the view finder. When the shutter is released and the holding claw 311 is rotated along the counter clockwise direction against the force 313, the shutter disk is free so as to finish the photographing. At the same time, the switch SW25 is opened so that a voltage is applied to the liquid crystal so as to display an alarm in the view finder that the shutter is not wound up.

Further in case of the composition shown in FIG. 34, the glass base plates 303 and 306 can serve as the condenser lens and the focus plate at the same time. In case of the so far mentioned embodiments, the photographic information or the alarm is displayed by the untransparent display in the display window or the view field frame. Hence when the direction of the polarization plane of the upper polarization plate is made perpendicular to that of the lower polarization plate the transparent part and the untransparent part can be exchanged for each other. Further the alarm can be display in color effectively when a color filter is provided in front of the liquid crystal or a color polarization plate is combined with the liquid crystal cell.

It goes without saying that not only the FE type liquid crystal cell as mentioned above but also the DSM type liquid crystal cell can be applied to the present invention.

Further by means of the display device in accordance with the present invention the photographic information, the alarm and so on can be displayed clearly in the view finder of not only the single reflex camera but also the range finder camera or the pocket camera without using the ampere meter or other complicated link mechanism. The device is now hard to damage and economical for production because of the liquid crystal cell.

Below the device in which one liquid crystal cell provided in a camera or so can be observed along the two directions by making use of the transparency of the cell will be explained.

Figure 36:
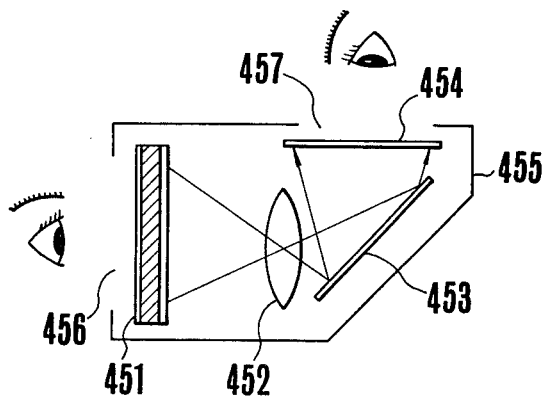
FIG. 36 shows in section an embodiment of the display device in which one liquid crystal cell can be seen along the two direction.

FIG. 36 shows an embodiment of such a liquid crystal display device in section. In the drawing, 451 is the liquid crystal cell connected to a control means (not shown in the drawing) so as to display transparent letters or figures, 452 the lens, 453 the mirror, 454 the screen, 455 the casing serving as the mask means at the same time, 456 the first window and 457 the second window. With this composition, a display control signal is applied to the liquid crystal display cell 451 the cell 451 produces a transparent display so that the second window 457 acts as the lighting window in such a manner that the light is guided by means of the mirror 453 and the lens 452. Thus the display output of the liquid crystal cell 451 can be visually recognized through the first window 456. On the other hand, the first window 465 acts as the lighting window and the display output light of the liquid crystal cell 451 is formed on the screen 454 through the lens 452 and the mirror 453 so that the display output of the liquid crystal display cell 451 can be visually recognized from the second window 457. In this way, the device can easily be designed that the display of one display part can be visually recognized from the two positions.

Figure 37A:
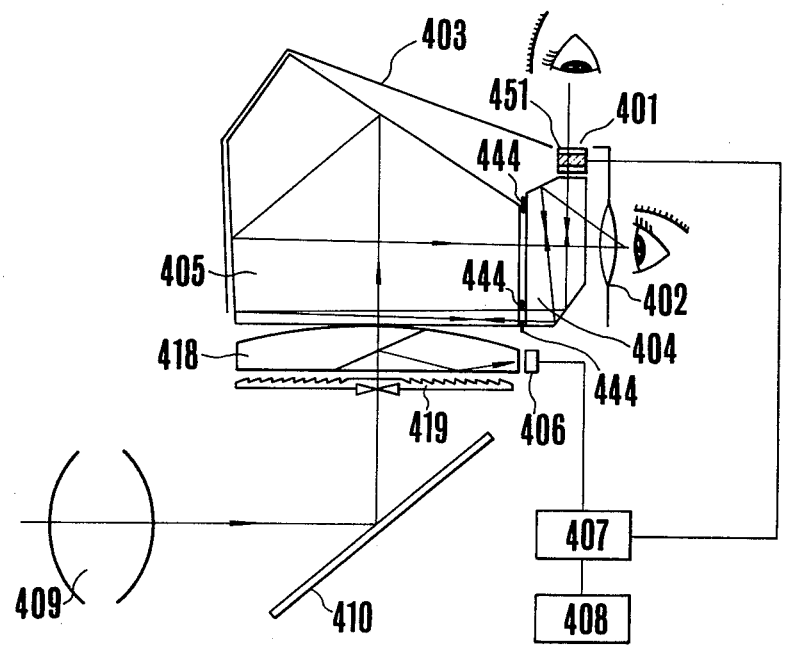
FIGS. 37(a) and (b) respectively show in section an embodiment of the liquid crystal display device shown in FIG. 36 which is applied to a single reflex camera.

FIGS. 37(a) and (b) respectively show the first and the second embodiment of such liquid crystal display device applied to a single reflex camera. The embodiments are cut in the neighborhood of the pentagonal prism. In case of the first embodiment shown in FIG. 37(a), 401 is the first information display window, 402 the view finder window serving as the second information display window at the same time, 451 the liquid crystal display cell for carrying out the transparent display, 403 the camera casing, 404 the prism for guiding the display output light of the liquid crystal display cell 451, 405 the pentagonal prism, 418 the condenser lens having a half permeable mirror. A light sensing element 406 senses the incident light for measurement from the condenser lens. Member 408 is the photographic information setting circuit for producing the preset value or the film sensitivity value and 407 the operation circuit connected to the photographic information setting circuit 408 and the light sensing element 406 for producing the display signal for the above mentioned liquid crystal display cell 451. Member 419 is the focus plate, 410 the mirror, 409 the photographic lens and 444 the mask.

In the circuit of FIG. 37(a) the display signal from the operation circuit 407 causes the liquid crystal to display cell 451 display the photographic data such as the operated value, the preset value, the alarm signal and so on in a transparent way. At this time, the first information display window acts as the lighting window whereby the display output light of the liquid crystal display cell 451 can be visually recognized from the view finder window 402 through the prism 404, the pentagonal prism 405, and again the prism 404 as is shown by the arrow in the drawing. On the other hand, the view finder window 402 also acts as the lighting window, whereby the light is guided to the liquid crystal cell 451 along the inversed optical path so as to be visually recognized through the first information display window.

When hereby the length of the optical path from the display plane of the liquid crystal display cell 451 to the view finder window 402 is chosen so as to be equal to that of the optical path from the focus plate 419 to the view finder window 402, the object to be photographed and the information display are seen respectively at the same position in the finder view field.

Figure 37B:
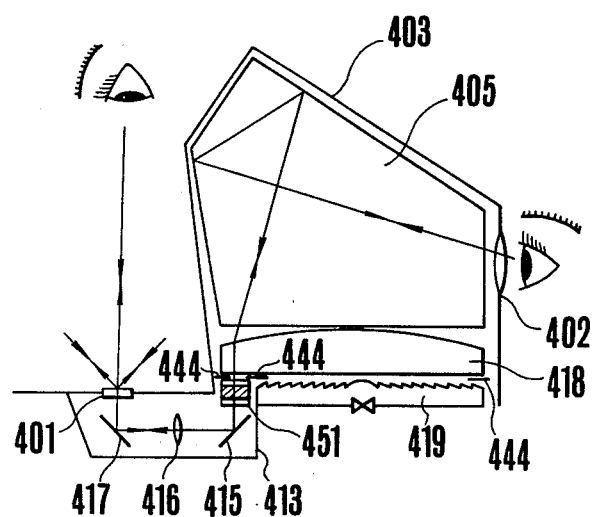

In the second embodiment shown in FIG. 37(b), the same elements as in the first embodiment have the same figures. Thus the mirrors 415 and 417 and the lens 416 compares the light guide part from the liquid crystal display cell 451 to the first information display window 401, while 413 is the plate for shading the light guide part from the photographic optical system. In the second embodiment the liquid crystal display cell 541 is provided beside the focus plate so that the information display is made beside the object to be photographed, whereby in the same way as in case of the above mentioned embodiment a clear finder view field can be obtained by means of the mask 444.

As explained above in detail the pair of the windows of the present embodiment respectively act as the window of the light incident on the liquid crystal and as the window for the light coming out of the liquid crystal alternatively, whereby the most important feature is the double direction.

Below the device for illuminating the liquid crystal cell in a dark place when the liquid crystal cell is used as the view finder display in a camera will be explained.

Figure 38:
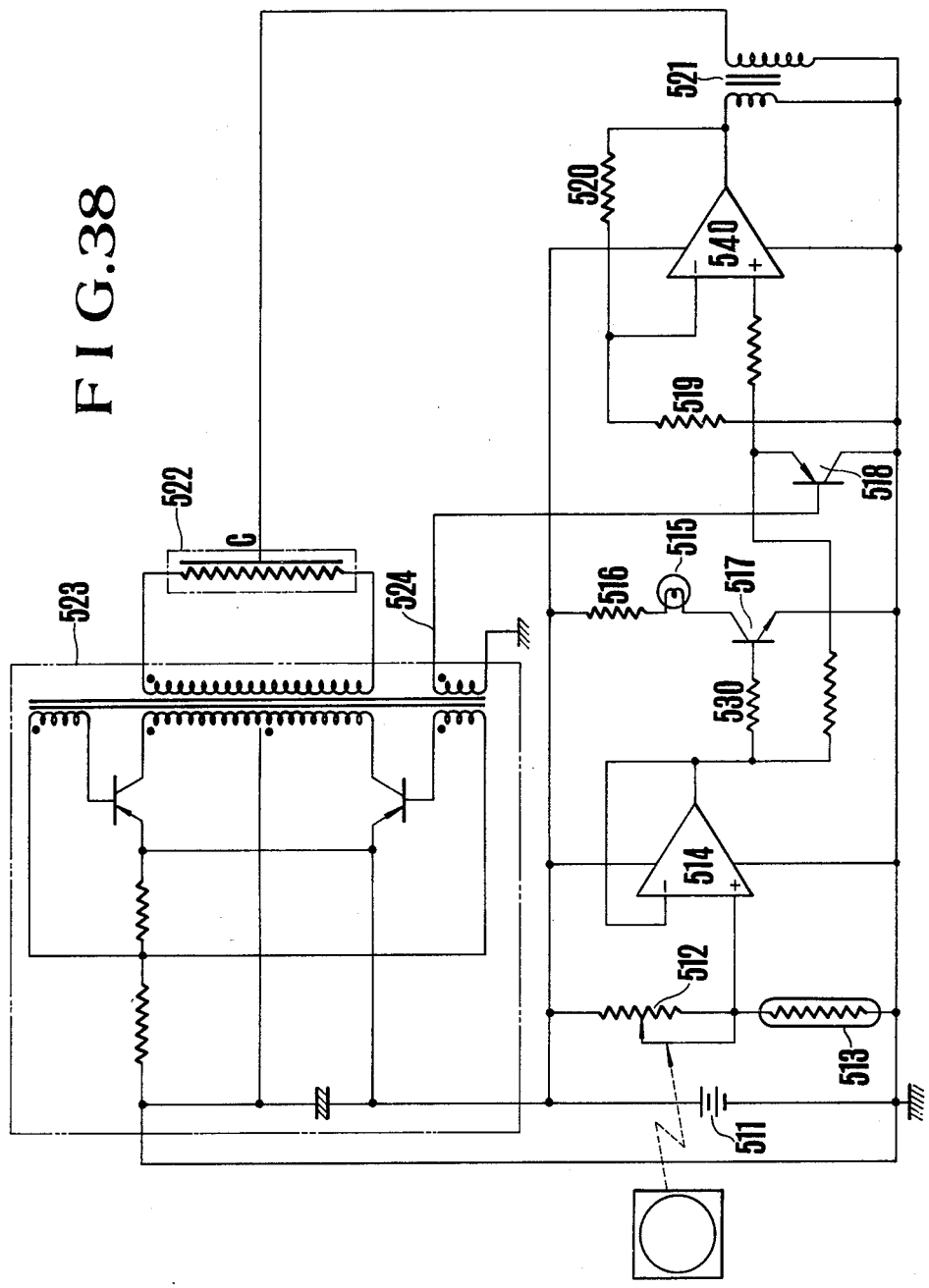
FIG. 38 shows a circuit for illuminating the liquid crystal cell.

FIG. 38 shows the driving circuit for the liquid crystal cell and the illuminating lamp in the present embodiment. In this embodiment an illuminating lamp is used as illuminating body. In the drawing, 511 is the power source battery, 513 the photoconductive element (hereby CdS is used), 512 the dividing resistance and 514 the operation amplifier between whose inversing terminal and whose output terminal a no load feed back circuit is connected so as to compose a buffer circuit. 515 is the illuminating lamp provided behind the liquid crystal so as to illuminate the liquid crystal. Member 516 is the current limiting resistance for controlling the current to be supplied to the illuminating lamp, 517 the transistor connected in series with the illuminating lamp and 524 the operation amplifier forming a non-inversing amplifier with the resistances 519 and 520. Member 518 is the transistor connected parallel to the non-inversing input terminal of the operation amplifier 524, and 521 the transistor connected to the output terminal of the operation amplifier 524. 523 is the DC-AC inverter, namely the transistor type two stone inverter. 522 is the liquid crystal cell to be driven by A.C. voltage.

Below the operation of the driving circuit for the above will be explained. A voltage corresponding to the amount of the light incident on CdS 513 is produced at the output terminal of the operation circuit 514 in such a manner that at the output terminal of the operation circuit 540, an output voltage amplified by the ratio of the value of the resistance 520 to that of the resistance 519.

On the other hand, at the output terminal of the above mentioned DC-AC inverter another trap 524 is provided in such a manner that by means of the output voltage from the trap 524 the above mentioned transistor 518 is switched on anf off. Thus at the output terminal of the transformer 521 an A.C. voltage is produced with the same frequency as that of the output A.C. voltage of the DC-AC inverter, being synchronized with the output A.C. voltage. Thus produced output voltage is applied to the C electrode of the liquid crystal cell 522, on which the light measurement information is displayed.

Below the driving principle of the illuminating lamp 515 for illuminating the liquid cell will be explained.

When the brightness of the object to be photographed is lowered while the resistance value of CdS 513 is raised, the output voltage of the operation amplifier 514 goes up until it surpasses a certain determined level in such a manner that the transistor is switched on and the illuminating lamp 515 is lit up. Here the resistance 530 is adjusted in such a manner that the above mentioned illuminating lamp 515 is lit up when the visual acknowledgement of the display in the view finder becomes difficult.

As explained above, in accordance with the embodiments in accordance with the present invention, a finder liquid crystal display device which is bright even in a dark place can be offered, whereby the illuminating body illuminates automatically when it is dark, so as to prevent from illuminating alway and thus to minimize the power consumption, which practical effect is very large.

What is claimed is:

1. A view finder display device, comprising:
  (a) a liquid crystal cell for displaying photographic information placed at a position providing a virtually clear vision within a view finder optical system, said cell having ends;
  (b) mask means to mask an end of said liquid crystal cell so that only a display part of said cell is displayed within the view finder;
  (c) a brightness detecting circuit which detects an object brightness and generates a prescribed level of output when said brightness falls below a prescribed level; and
  (d) a light source, which emits light in response to said prescribed level of output of said brightness detecting circuit and is so provided as illuminating said liquid crystal cell.

2. A view finder display device according to claim 1, wherein said liquid crystal cell includes:
  (a) two base plates facing each other;
  (b) a resistance layer provided at a plane of one of said base plates for providing a potential distribution along the liquid crystal when a voltage impressed across said resistance layer; and
  (c) a conductive layer in a plane of the other one of said base plates facing said resistance layer, wherein a voltage corresponding to a photographing information is impressed on said conductive layer.

3. A view finder of a camera, comprising:
  (a) a focus plate having a notch on its surface;
  (b) an electro-optical conversion unit having a terminal electrode and exhibiting optical characteristics corresponding to a voltage impressed on said electrode for displaying a photographic information, said unit being mounted at said notch in the focus plate;
  (c) terminals at different locations of said resistance layer of said liquid crystal cell;
  (d) means for impressing a voltage corresponding to information to be displayed onto said transparent conductive layer;
  (e) a first, a second and a third electrode on a plane of the base plate having said transparent resistance layer, said resistance layer having end portions wherein said first and second electrodes are connected to the end portions of the resistance layer while the third electrode is electrically separated from said first and second electrodes but is connected to the conductive layer in the other one of the base plates.

4. A view finder according to claim 3, wherein a portion of the base plate at which conductive layer is provided and at protruding beyond the other portion.

* * * * *